United States Patent
Skazinski et al.

(12)

(10) Patent No.: US 6,247,099 B1
(45) Date of Patent: Jun. 12, 2001

(54) SYSTEM AND METHOD FOR MAINTAINING CACHE COHERENCY AND DATA SYNCHRONIZATION IN A COMPUTER SYSTEM HAVING MULTIPLE ACTIVE CONTROLLERS

(75) Inventors: Joseph Skazinski, Bertoud; Brian McKean, Longmont; Noel S. Otterness, Boulder, all of CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/325,033

(22) Filed: Jun. 3, 1999

(51) Int. Cl.[7] ........................................... G06F 13/16
(52) U.S. Cl. ........................ 711/141; 711/117; 711/118; 711/144; 711/145
(58) Field of Search ................................ 711/117, 118, 711/141, 144, 145

(56) References Cited

U.S. PATENT DOCUMENTS

| | | | | |
|---|---|---|---|---|
| 5,727,209 | * | 3/1998 | Slingwine et al. | 709/102 |
| 5,752,264 | * | 5/1998 | Blake et al. | 711/144 |
| 6,073,218 | * | 6/2000 | DeKoning et al. | 711/150 |

* cited by examiner

*Primary Examiner*—Than Nguyen
(74) *Attorney, Agent, or Firm*—Flehr Hohbach Test Albritton & Herbert LLP

(57) ABSTRACT

System, method and computer program for maintaining cache coherency amongst a plurality of caching storage controllers operating in unison supplying data in response to requests from one or more host computers. The method comprises the steps of defining a reservation data structure to maintain reserved, partial, and full ownership status of data extents that are part of the logical unit or storage volume, and using the reservation data structure to verify that a new update to the data is allowed.

41 Claims, 27 Drawing Sheets

SYSTEM AND METHOD FOR MAINTAINING CACHE COHERENCY AND DATA SYNCHRONIZATION IN A COMPUTER SYSTEM HAVING MULTIPLE ACTIVE CONTROLLERS

FIELD OF THE INVENTION

This invention pertains generally to a computer structure and method that provide cache coherency amongst a plurality of caching storage controllers operating in unison to supply data requests to one or more host computers, and more particularly to a cache and a cache reservation structure and method that use an updatable reservation table to maintain data consistency and access rights to data extents on controlled storage devices.

BACKGROUND

In FIG. 1 there is illustrated a typical computer system 20 having a host computer 21 with a processor 22 and associated memory 23, one or more data storage subsystems 24, 25 each having a plurality of hard disk drives 26, 27, first and second storage controllers 28, 29 coupled between the host computer and the storage subsystem by interfaces and communications links of conventional type, such as for example, busses or network connections, When the first and second controllers 28, 29 are caching storage controllers (described below), each controller includes a cache memory 30, 31 that serves as intermediate storage. Usually the cache memory is fast random access memory (RAM) of which there are many types.

Increasingly, there is a need to provide access to stored information or data on hard disk drives (or other storage devices) from a plurality of host servers and to also permit the data stored on any particular storage device to be accessed through alternative device controllers. Providing access to the data from multiple hosts eliminates the need to store the data at more than one location (though the data may still be redundantly stored using known mirroring or Redundant Array of Independent Disk (RAID) techniques) and in theory assures that the identical data can be accessed by interested parties. Providing accesses to a storage device through multiple controllers, provides redundant access to the device from an alternate (or second) controller so that the data remains accessible in the event that the first controller fails.

Although providing access to storage devices through multiple controllers is desirable, such a configuration may present data consistency problems. Data consistency refers to all controllers providing visibility to one identical copy of the data. Data consistency can be provided through data synchronization or data coherency or both. Data coherency refers to maintaining a consistent copy of the data in each of the controllers caches. Data synchronization refers to keeping the data in the storage controller's cache the same as that in the storage device.

A storage controller is a device which is capable of directing and data traffic from the host system to one or more non-volatile storage devices. It may or may not have an intermediary cache to stage data between the non-volatile storage device and the host system. A caching controller (or caching storage controller) is a device which is capable of directing the data traffic from a host system to one or more non-volatile storage devices which uses an intermediary data storage device (the cache memory) to stage data between the non-volatile storage device and the host system. In general, the intermediary storage device is built out of RAM to allow a quicker access time to the data. Furthermore, it provides a buffer in which to allow exclusive-or (XOR) operations to be completed for RAID 5 operations. Multiple active controllers are defined as a collection of storage controllers or caching storage controllers which work in a cooperative manner with each other. They provide the ability for recovering from a controller failure by allowing multiple paths to a storage volume. The storage volume is a contiguous range of randomly accessible sector of data. For practical purposes, the sector numbering starts at 0 and goes to N, where N is the total number of sectors available to the host system. A data extent is a range of data within a storage volume delineated by a starting sector and an ending sector. The storage volume is broken up into a number of data extents which are not required to be of the equivalent sizes, but may not overlap. These concepts are used in the discussion of the background and the detailed description of embodiments of the invention, and apply to both.

Caching storage controllers that work independently of one another to store information or data to a secondary storage unit, such as a hard disk drive, or tape unit, are conventionally available. There are also caching storage controllers that work with one or more other controller(s) to provide multiple controller access to a secondary storage unit and provide a fault tolerant environment. If two controllers are simultaneously providing access to a common set of storage devices and each is able to take over the other's functionality in the event of a failure, then those controllers are referred to as active-active or dual-active controllers.

Computer system configurations involving one of more host computers and having two or more controllers that use cache technologies, with access to a storage device through any of the controllers, should desirably provide some mechanism of ensuring that the cache data in each controller is always correct. Unfortunately in conventional systems they may not. Controllers using the SCSI command set could use two commands that are provided in that command set, the "Reserve LUN" and "Release LUN" commands, when LUN is an abbreviation for Logical Unit Number. (SCSI commands, including the Reserve LUN and Release LUN commands, are described in standard references including SCSI-2 Small Computer System Interface-2 ANSI X3.131:1994: which is incorporated herein by reference.) The host computer, especially one operating in a cluster environment, could use these two commands to reserve all accesses to the entire LUN.

Unfortunately, not all host computers use these SCSI commands. Furthermore, the Reserve LUN and Release LUN commands do not provide for reservation of a portion of a storage volume because they apply to the entire storage volume.

The following description is provided relative to FIG. 2, and sets forth the problems with data synchronization between controllers which maintain local cached copies of data. This example details one set of host transactions that could cause data integrity problems (data consistency and data synchronization problems). The data consistency problem is brought about by the fact that each controller's cache operates independently.

With reference to the illustration in FIG. 2, there is shown a portion of computer system 31, including host computer 32 having a processor or central processing unit (CPU) 33, first controller (controller "A") 34, second controller (controller "B") 35, a storage subsystem 36 including at least one backing storage volume 37. Each of the two controllers 34, 35 further separately include first cache (Cache "A") 44 and second cache (Cache "B") 45 for caching data retrieved from backing storage volume 37. Generic techniques for controller caching are known in the art and not described further here. (The inventive structure and method provide certain features, including inventive data structures and methods, that are different from conventional caches and solve the problems associated with conventional controllers and caches, and these differences are described in greater detail in connection with the detailed description of embodiments of the invention.)

Backing storage volume 37 is coupled to each of first and second controllers 34, 35 by storage interface channels 38, 39, and host computer or processor (CPU) 33 is coupled to the controllers by CPU-to-storage device interface 40. The interface 40 may typically be implemented as a Personal Computer Interface (PCI), parallel SCSI, fibre channel, or IEEE-1394 (fire-wire) interface using a storage, file system, or other communications protocol. In like manner, the controller-to-storage device interfaces 38, 39 may typically be implemented using the same set of interfaces and protocols as just described for interface 40. A logical unit number (LUN) is assigned or otherwise associated with each backing storage volume 37. The relationship between physical devices or portions thereof and logical devices is known in the art and not further described here.

In this configuration, if data is written to a logical unit, such as backing storage volume 37A through first controller 34, the data is properly retained in the first controller's cache, that is within cache 44. If data is subsequently written to logical storage unit 37A through second controller 35, the newly written data in backing storage volume 37A matches the data in the second controller's cache 45, but the information in the first controller's cache 44 will not have been updated, and (if the newly written data is different from the original data) no longer matches the data written to the backing storage volume 37A. If a request to read the data is made through first controller 34, the data will be read from cache 44 according to standard data caching and retrieval practices to minimize backing storage volume access, and the wrong information will be returned to the requestor. The data is said to lack coherency between different locations (that is between one or more of the backing storage volume, cache 44, and cache 45), and is out of temporal synchronization as a result of the time-order of events involving the read, write, and caching operations.

Stating the problem in somewhat more concrete terms, in a system with two controllers 34, 35 attached to the same CPU/storage interface and sharing access to a backing storage volume 37, as illustrated in FIG. 2, host computer 33 writes data pattern "AAAA" to the backing storage volume through first controller 34. First controller 34 retains this information in its data cache 44 so that future requests for the data can be fulfilled without having to access the disk backing storage volume 37A. At a later time, the host computer writes the data pattern "BBBB" to backing storage volume 37A at the same location the "AAAA" data pattern had been stored, but now the write operation is directed through the second controller 35 as illustrated in FIG. 3. First controller 34 still has the "AAAA" data pattern stored in its cache 44, but second controller 35 has the "BBBB" data pattern stored in its cache 45. The data in cache 44 ("AAAA") and the data in cache 45 ("BBBB"), each supposedly representing the identical data, no longer match and are incoherent.

The correct data pattern on backing storage volume 37A ("BBBB") is the later data pattern also stored in cache 45 ("BBBB"), but if the host computer 33 attempts to read the information from backing storage volume 37A through first controller 34, first controller 34 will, using conventional techniques, be unaware of any controller 35 operations, and in particular will be unaware that a write operation has altered the data on the backing storage volume. Lacking knowledge that the data has changed, first controller 34 will access it's own cache 44 to retrieve the data, and erroneously return that data pattern ("AAAA") rather than the correct data pattern ("BBBB") to the requesting host computer 33.

Absent some technique for coordinating the actions of the two controllers 34, 35 and their caches 44, 45, or of making one controller aware of the activities of the other controller, data integrity using conventional methods cannot be assured. Therefore, there remains a need for apparatus and method to maintain data integrity under these circumstances.

SUMMARY

This invention pertains generally to a computer structure and method that provide cache coherency amongst two or more caching storage controllers operating in unison supplying data in response to requests from one or more host computers. More specifically, the invention provides a reservation structure and method that uses a logical storage unit (LUN) reservation table to maintain reserved, partial, and full ownership status of data extents that are part of the logical unit or storage volume. A host computer's update to any logical storage unit uses the LUN reservation table to verify that a new update to the data is allowed, or can be granted. Controller cache coherency with the storage unit is tied in with the updates of the LUN reservation table.

The inventive structure and method provide a logical unit reservation capability for active controllers in an environment that allows data access through two separate caching controllers that maintains data integrity, including data coherency and data synchronization. A reservation table formed as a data structure within a memory in each of a plurality of controllers stores information indicating which controller has access rights and optionally what those access rights are, to specific storage volume or unit locations. The reservation table is maintained consistent on all controllers so that cache coherency between the plurality of controllers is preserved.

The inventive structure and method provide a mechanism for a controller to implicitly reserve a portion of the shared storage devices as needed to satisfy data read and write requests generated externally from the attached CPUs as well as internally generated access requirements. Explicit reservations may also be made. The inventive structure and method provides this functionality, while also complying with access restrictions imposed by the attached CPUs through the use of mechanisms provided by the particular interconnect protocol implemented, for example, through the SCSI Reserve and SCSI Release commands.

Embodiments of the inventive structure and method utilize one or more of cache data invalidation, cache flushing, forced data synchronization between the cache and the storage medium, and controller reservation synchronization to maintain user data consistency between controllers.

A computer program product for maintaining cache coherency amongst a plurality of caching storage controllers is also provided which includes a computer readable medium and a computer mechanism stored thereon implementing the inventive method and procedures thereof.

BRIEF DESCRIPTION OF THE DRAWINGS

FIGS. 7a–7d show the location of extents and locks as sequential operations take place relative to the storage volume.

DETAILED DESCRIPTION OF EMBODIMENTS OF THE INVENTION

We first present a few potential solutions to the data consistency problem that may provide some benefits but do not provide an entirely satisfactory or complete solution to the problems and deficiencies already described. We then describe an inventive structure and method that overcome the disadvantages, deficiencies, and problems of the prior-art.

The simplest technique for overcoming the data consistency problem is to not maintain data in the cache after the input/output operation has been completed to the host. The problem with this potential solution is that without a cache, the controllers performance is severely degraded so that while this potential solution may solve the data consistency problem, it does not provide for a viable commercial product.

A second potential solution is to provide "cache coherency". Cache coherency implies that the data related to a particular storage volume is consistent and equivalent in all the caches through which that particular storage volume can be accessed. Because the caches are consistent with each other, there is no absolute requirement that the data in the caches be consistent with the data on the backing non-volatile storage medium or volume.

Figure 1:
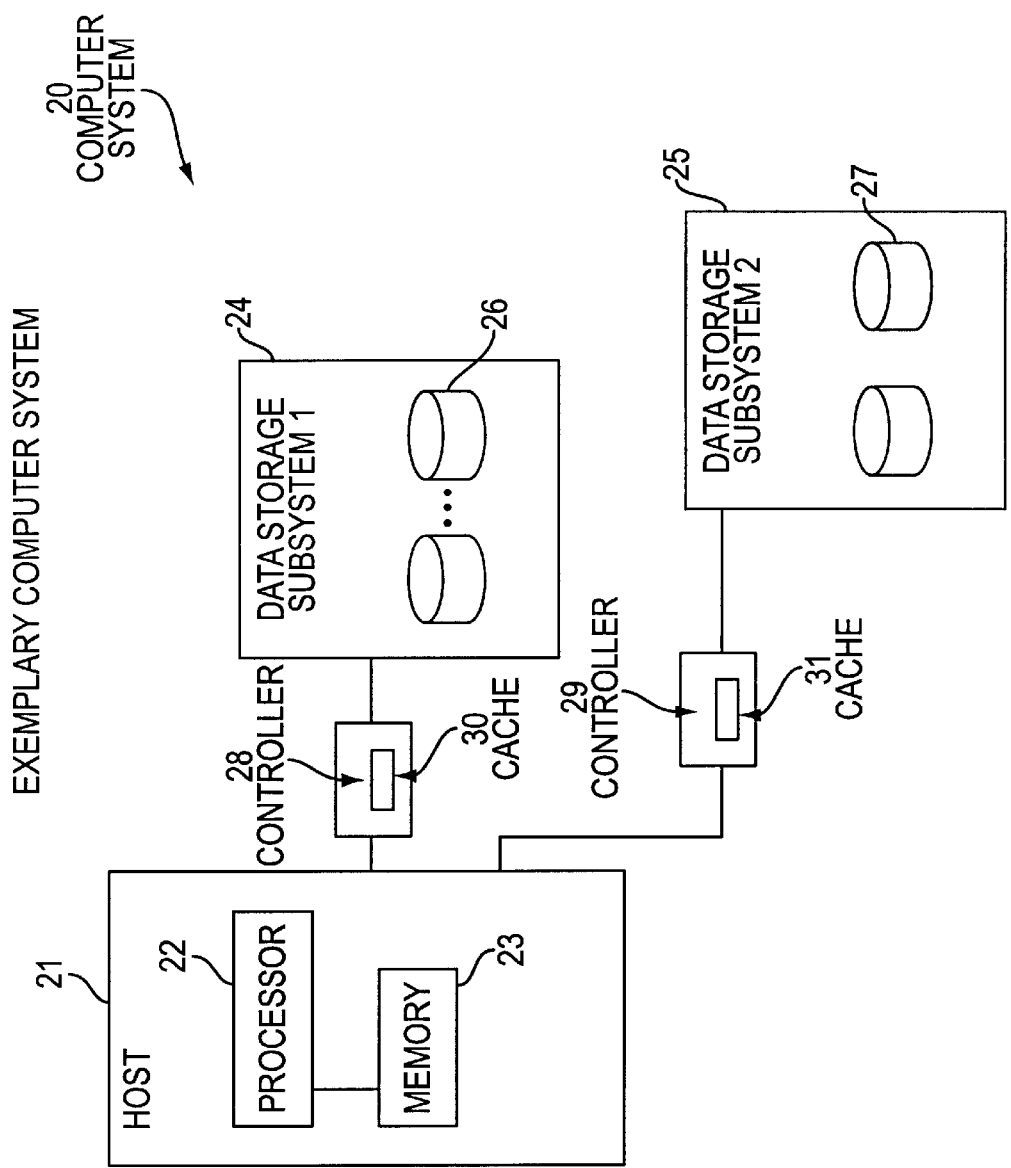
FIG. 1 is a diagrammatic representation of an exemplary computer system to which the inventive structure and method may be applied.
Figure 2:
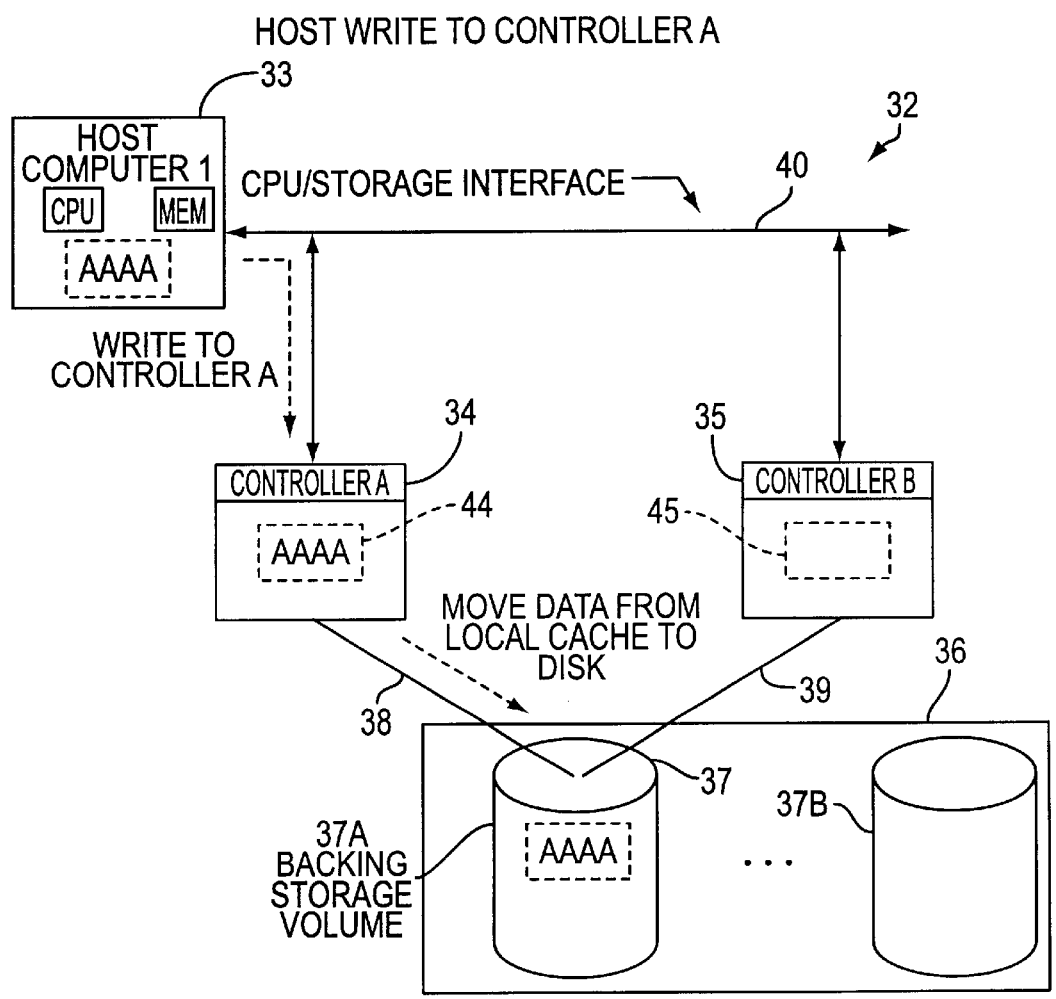
FIG. 2 is a diagrammatic representation of a host computer request to write data to a first controller in a dual-active controller environment.
Figure 3:
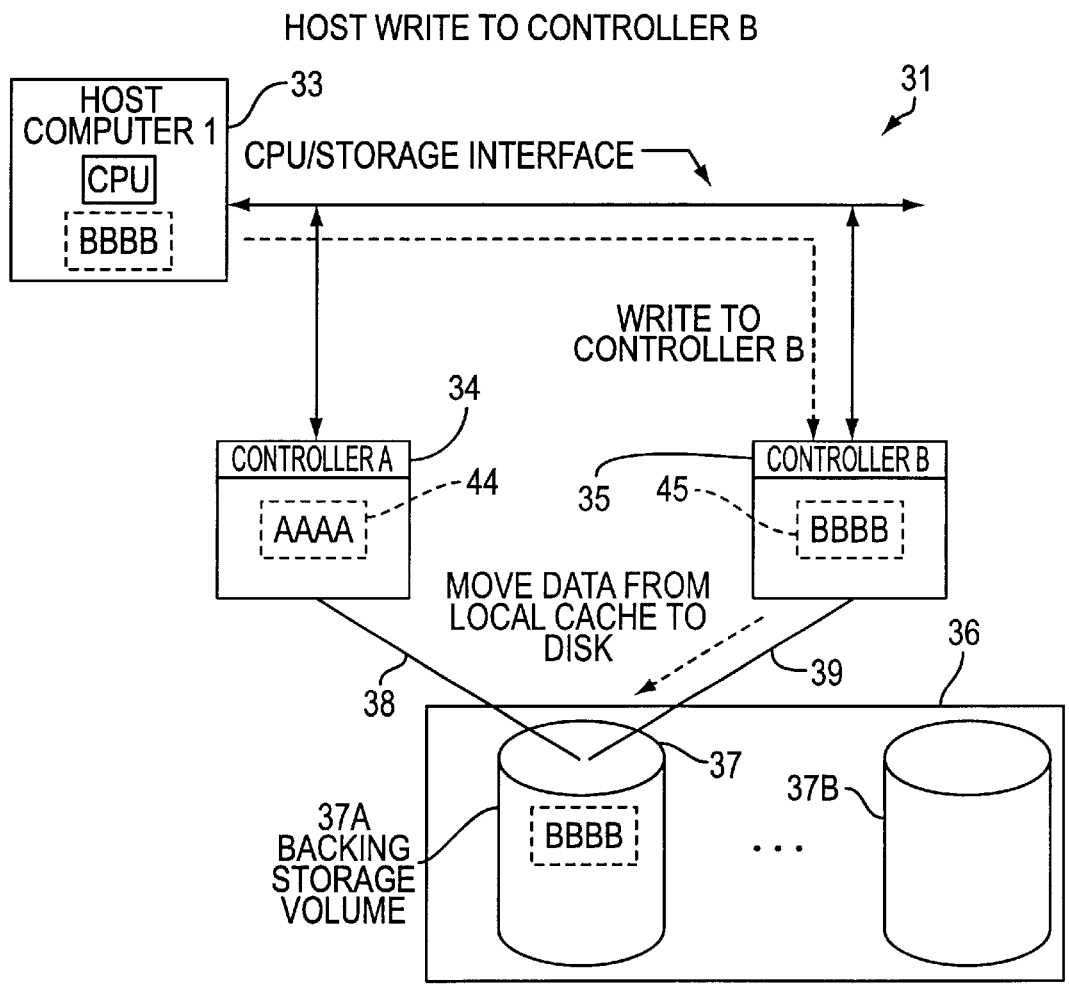
FIG. 3 is a diagrammatic representation of a host computer request to write data to a second controller in a dual-active controller environment where the write request is to the same storage device sector as in FIG. 2.
Figure 4:
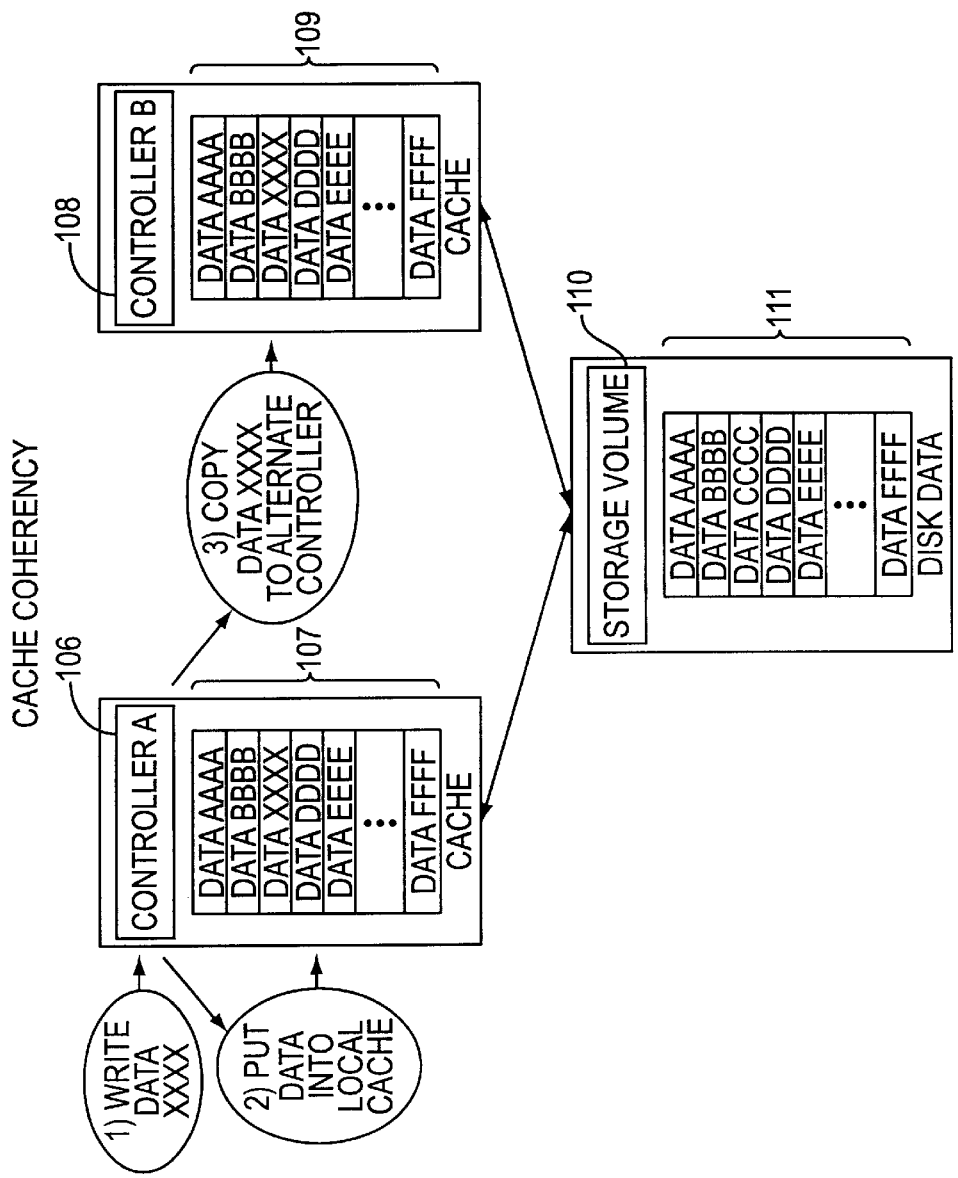
FIG. 4 is a diagrammatic illustration illustrating cache coherency for dual-active controllers each having a cache and accessing a common storage volume.

In a cache coherency based technique, several steps must be performed before a write operation can be completed to the host system. In the system 102 of FIG. 4, there is shown a first controller 106 and its associated local cache 107; the second controller 108 and its associated local cache 109; both of which are coupled to storage volume 110 having a plurality of disk data storage locations 111. For simplicity of illustration, the host system 101 is not shown.

Before a write operation can be completed to the host system, three major steps must be performed. First, the write is received for particular data extent(s) within storage volume 104. Next, the controller which receives the write must first allocate space 113 for the data within its local cache (either cache 107 or cache 109) and then bring the data into he cache. At this point, the data is not necessarily consistent in the two controller caches or between the first controller 106 and the backing storage medium 104. In the third step, the data is copied from the local cache 107 of the controller which first receives the write into the alternate controller's cache 108. At this point in the process the data may be accessed from any other active controller's cache without worrying that the data will be different between the several controllers 106,108.

This cache coherency technique also provides a basis for allowing load balancing to be performed by either the host system 101 or by the controllers 106,108 themselves. This is possible, since the time penalty to access data from either controller is uniform. Unfortunately, there remains the problem that the time required to distribute the data amongst the controllers using standard interconnections can be quite costly. Because cache coherency requires that data must be the same in all caches, this limits the amount available cache base to be the fraction 1/N of the total cache base, where N is the number of caching controllers in the system. For at least this reason, this potential cache consistency solution is not entirely satisfactory and a method is still needed which does not require the overhead associated with cache coherency and the additional cache resources.

A second possible partial solution is referred to as "data synchronization." Data synchronization implies that the data accessed from any controller for any storage volume is consistent. In a sense, it is related to cache coherency in that cache coherency is one technique for insuring data synchronization. Data synchronization is based on the premise or assumption that once a host system starts performing accesses to a storage volume through one path it will continue to perform accesses to the same storage volume through the same path until a failure occurs in that path. This assumption also implies that the locks for a storage volume, once obtained, are not likely to change. This limits the number of controller-to-controller messages that need to be sent back and forth to a manageable number, were typically the messages are concentrated into an initial time period with few messages transmitted thereafter.

Figure 5:
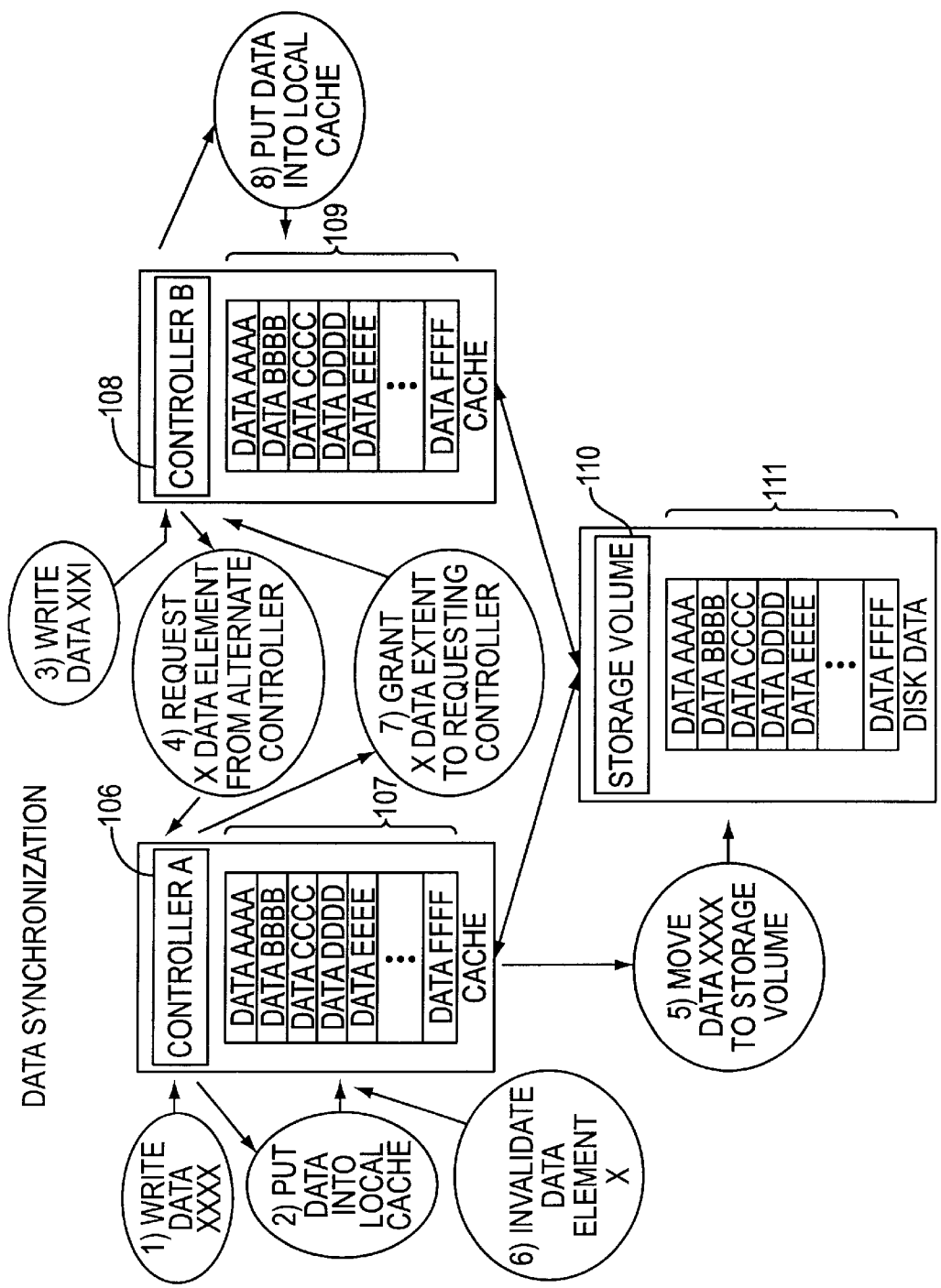
FIG. 5 is a diagrammatic illustration illustrating data synchronization for dual-active controllers each having a cache and accessing a common storage volume.

We now describe one procedure for providing data synchronization in a system before a write operation can be completed to the host system relative to be diagrammatic illustration in FIG. 5. First, the write is received for particular data extents within a storage volume to first controller 106, next, the controller which receives the write must first allocate space for the data within the its local cache and then bring the day in from the host system. At this point, the data may not be consistent between the controllers or between the first controller (controller A) 106 and the backing storage medium or volume 110 and a third step, the write is received by the second controller (controller B) 108 for the same data extents within the storage volume 110 as was previously written to the first controller 106. The fourth step, the second controller (controller B) must first gave permission to accept the data from controller A 106. This is accomplished by making a lock request to controller A for the data extent.

In a fifth step, controller A 106 must first move the previously written data to the backing storage medium 110. At this point the data has been synchronized between controller A and controller B since the new data has not been received by controller B. in step sex, the data in controller A which overlaps the data extent which was requested by controller B must now be invalidated. The combination of invalidated the data, and insuring that any new request for the data extent through controller A must first be granted by controller B completes the requirements for providing data synchronization. In step 7, after the data has been written to the backing storage medium 110, and cache lines within the data extent are invalidated, the lock request can be granted to controller B. In step eight, controller B can now acquire the required cache lines and accept data from the host system.

While this data synchronization technique has some benefits, it has an important limitation in that unfortunately, if the host system is using a load balancing I/O driver, the data synchronization technique can be quite costly in that each controller will be fighting for exclusive access to the storage volume, thereby limiting any other controller's access. Therefore, this technique though providing some degree of data synchronization does not adequately support load balancing.

Storage Volume Reservation System and Method

We now turn our attention to a description of an embodiment of the inventive storage volume reservation system and method. The inventive structure and method provides a storage volume (or storage LUN) reservation system for active controllers in an environment that allows data access through two or more separate caching controllers. The inventive structure and method maintains a "reservation table" (such as a LUN reservation table) that is always consistent on each of the plurality of controllers. This structure and method also provide the capability of explicitly reserving storage volumes using any current storage volume (or LUN) reserve commands, or implicitly using a write operation. The inventive structure and method also provide the capability of invalidating a controller's cache based on acquiring new reservation.

By way of an overview, the inventive structure and method provide that each controller would not have to reserve a storage volume in order to perform an update to that storage volume. An explicit reservation may be made through the use of a Storage Volume Reserve commands, while an implicit reservation is made whenever a write operation requires that the particular controller obtain a reservation. Implicit reservations may occur for example when an alternate controller already owns the reservation. The reservation may also be obtained implicitly when the controller is required to perform a read operation, and the alternate controller already owns the reservation. This reservation requirement is imposed in order to ensure that the alternate controller's cache contains no data (dirty data) that has not been synchronized with the storage volume drive.

The reservation process is synchronized between all of the controllers in the system in order to maintain reservation table coherency. All updates to the reservation table are propagated to the alternate controllers to maintain reservation table coherency. This procedure allows most reads and writes to be performed with minimal overhead. An I/O operation to a storage volume that is reserved by that controller only needs to check for that ownership before processing the I/O operation request.

The reservation process also benefits from cache flushing and cache invalidating in some circumstances to maintain data integrity. Obtaining a reservation to a storage volume or portion thereof that is not owned by any controller is straightforward and only requires an update to the reservation table, and it's propagation to all alternate controllers. Obtaining a reservation to a storage volume or portion thereof currently owned by an alternate active controller further requires that the alternate controller flush and invalidate all cache data associated with that storage volume. Releasing a reservation is not required but may optionally be performed using storage volume release command.

The inventive structure and method allow dual-active (active-active) controllers to operate in any clustered server environment without any special host drivers, without any logical unit affinity to each host, and with minimal overhead to maintain the reservation table and to the invalidate controller caches.

The inventive structure and method and are adapted to operate, for example, in an environment having multiple active RAID storage controllers operating in a Storage Area Network environment. Each storage controller may be accessed from one or more host computers that perform operations, such as SCSI protocol based operations, to the controllers. We focus our description on SCSI operations because of the large percentage of storage systems that utilize SCSI compliant operations; however, the inventive structure and method are not limited to SCSI operations or to the particular SCSI commands identified and described here.

The SCSI operations, and generically similar non-SCSI operations, that are all of primary interest here include the following operations: reserve, release, write, and read commands. These commands use an addressing scheme that is based on logical unit numbers (LUN), the prevalent SCSI term for addressing a storage medium. In non-SCSI implementations, some other storage medium addressing scheme may be used. In an SCSI based RAID storage system, the RAID controllers handle all data accesses from the host based on LUN addressing. By using a LUN address value, the host computer can store data for given data extent. Each LUN includes storage for a maximum number of sectors, were each sector can store a certain amount of user data, typically 512 bytes of user data.

The inventive structure and method further provide means of preserving user modified data by maintaining coherent controller caches with the inventive reservation table, which in one particular embodiment is referred to generally as the Storage Volume Reservation Table, and in other SCSI specific embodiments as the LUN Reservation Table. These terms are used interchangeably here. Embodiments of these Reservation Tables are described more fully in the sections that follow.

Storage Volume Reservation Table (SVRT)

The Storage Volume Reservation Table is a data structure defined in a memory of each controller for the embodiment now described. (Other embodiments of the inventive structure and method may provide for Storage Volume Reservation Table(s) that exist in location(s) separate from the controllers.) The layout or configuration of this data structure may be identical for each controller, but the actual contents stored within the SVRT data structure will typically be specific to each individual controller. The SVRT contains one entry for each possible storage volume addressable by the host. The table is indexed by a storage volume number value, and each reservation table entry includes the following data fields: an Ownership Field, a Hash Table of Locks, and a Linked List of currently blocked data extents.

The Ownership Field specifies either that the controller in which the SVRT resides holds the reservation for this storage volume, or that another controller reserves the storage volume. This Ownership Field requires an additional qualifier that identifies one of the following data sector lock status: (a) the storage volume contains a "full lock" of all data sectors, (b) the storage volume contains one or more number "partial locks", or (c) certain data sectors are temporarily blocked. The hash table of locks field is indexed by Hash Entry (HE) value, for example from hash entry number 1 to hash entry number 1K for each storage volume, where K is the number of entries in the hash table. As each lock is established it is assigned to a hash entry value calculated using a modulo operation on the start sector value of the lock. The hash table of locks is used in order to provide fast access times to outstanding locks. An exemplary embodiment of a Storage Volume Reservation Table is illustrated in Table I.

Table I is an example of an embodiment of a storage system reservation table for a system with three storage volumes. Storage Volume 0 has partial locks only. The locks are assigned to hash table entries. Storage Volume 1 has no locks. Storage Volume 2 has a full lock. This lock is assigned to hash table entry number 1.

TABLE I

Structure of Exemplary Embodiment of Storage Volume Reservation Table

| Storage Volume | Volume State | | | | | Hash Table of Locks | | | |
| --- | --- | --- | --- | --- | --- | --- | --- | --- | --- |
| | Full Lock | Partial Lock | Block Lock | Reservation Local | Reservation Remote | | | | |
| Storage Volume 0 | 0 | 1 | 0 | 0 | 0 | HE1 | Lock1 | Lock2 | — |
| | | | | | | HE2 | Lock3 | Lock5 | — |
| | | | | | | ... | | | |
| | | | | | | HEk | Lock4 | — | — |
| Storage Volume 1 | 0 | 0 | 0 | 0 | 0 | HE1 | — | — | — |
| | | | | | | HE2 | — | — | — |
| | | | | | | ... | | | |
| | | | | | | HEk | — | — | — |
| Storage Volume 2 | 1 | 0 | 0 | 0 | 0 | HE1 | Lock6 | — | — |
| | | | | | | HE2 | — | — | — |
| | | | | | | ... | | | |
| | | | | | | HEk | — | — | — |

The Storage Volume State field within the Storage Volume Reservation Entry data structure provides a set of six flags which allow a quick check to be made to determine the state of reservations for a storage volume. The reservation state may be any one of $NO_{13}$ LOCKS (nobody currently owns any locks), PARTIAL_LOCKS (this controller owns pieces of the storage volume, but not the entire storage volume), BLOCK_LOCK (a temporary blocking lock is in place for this storage volume, likely indicating that another controller is performing an operation such as a rebuild or consistency check), LOCAL_RESERVATION (this controller has a SCSI Reserve command outstanding for this storage volume), and REMOTE_RESERVATION (another controller has a SCSI Reserve command outstanding for this storage volume). These flags may advantageously be implemented by setting a single binary bit is a predetermined bit-position to either a first logical state (e.g. "0") or to a different second logical state (e.g. "1").

For each controller, a remote locks pending list (remoteLocksPending) is provided which contains all of the outstanding lock requests for this storage volume made by other controllers. A local locks pending list (localLocksPending) contains all of the outstanding lock requests made by this controller to other controllers. A data extent hash table (dataExtent) contains all of the granted partial locks for this controller. A block locks list (blockLocks) contains all of the outstanding blocking locks which have been granted to other controllers. If there are any entries in the block locks list, the block lock flag (BLOCK_LOCK) in the Storage Volume State field should be set in the storage volume state field (storageVolumeState). Finally, a my block locks list (myBlockLocks) contains all of the outstanding blocking locks which have been granted to this controller. Pseudo code for an exemplary embodiment of the Storage Volume Reservation Table and Storage Volume Reservation Table Entries is provided in Table II.

TABLE II

Exemplary pseudo-code for an embodiment of the storage volume reservation table

```
typedef struct
{
  ** This is a set of flags which allow a quick check to be done
  ** on the state of the reservations for this storage volume
  ** NO_LOCKS -nobody owns any locks currently
  ** PARTIAL_LOCKS - this controller owns pieces of the storage
  ** volume, but not the entire storage volume
  ** BLOCK_LOCK - the temporary blocking lock is in place for this
  ** storage volume, likely another controller is performing
  ** the rebuild or consistency check
  ** LOCAL_RESERVATION - this controller has a SCSI Reserve command
  ** outstanding for this storage volume
  ** REMOTE_RESERVATION - another controller has a SCSI Reserve command
  ** outstanding for this storage volume
  */
  #define NO_LOCKS           0 x 0
  #define FULL_LOCK          0 x 1
  #define PARTIAL_LOCK       0 x 2
  #define BLOCK_LOCK         0 x 4
  #define LOCAL_RESERVATION     0 x 5
  #define REMOTE_RESERVATION    0 x 10
  U32 storageVolumeState;
  ** The remoteLockspending list contains all of the outstanding requests
for
  ** this storage volume from other controllers
  /*
  lockReqList remoteLocksPending;
  ** The localLockspending list contains all of the outstanding lock
requests
  ** made by this controller to other controllers.
  */
  lockReqList localLockspending;
  /*
  ** The dataExtent hash table contains all of the granted partial locks
  ** for this controller.
  */
  lockList locks{LOCK_HASH_TABLE_SIZE];
  /*
  ** The blocks lock list contains all of the outstanding Blocking Locks
  ** which have been granted to other controllers
  ** If there are any entries in this list the BLOCK_LOCK flags must be
set in
  ** the storageVolumeState field.
  */
  lockList blockLocks;
  /*
  ** The myBlockLocks list contains all of the outstanding blocking
  ** locks which have been granted to this controller
  */
  lockList myBlockLocks;
} StorageVolumeReservationEntry;
typedef struct
{
  #define MAX_SV_ENTRIES 8
  /*
  ** This data field contains one storage volume reservation entry for
  ** each and every possible storage volume.
  */
  StorageVolumeReservationEntry entries [MAX_SV_ENTRIES];
  /*
  ** This data field contains the current total number of Storage Volumes
  ** that are configured.
  */
  totalEntries;
} Storage Volume Reservation Table;
```

Storage Volume Ownership Transaction (SVOT)

The Storage Volume Ownership Transaction data structure is a data structure established in program memory of the controller and tracks the state of a current transaction between the controller in which the data structure is resident and an alternate controller. (The alternate controller also has a storage volume ownership transaction data structure.) A Transaction Value, a Current Status, a Time Stamp Value, a Reference to a Host Command, and a Reference to the Code that handles transaction completion are maintained in the Storage Volume Ownership Transaction data structure. The Transaction Value is a unique identifier used to initiate a Storage Volume Ownership Request and to track the corresponding Storage Volume Ownership Response. The Current Status value is a state variable that maintains the current state of the transaction. Current status may take on the values of LOCK_REQUESTED, LOCK_PENDING, LOCK_GRANTED or LOCK_CLEARING. The Time Stamp value is used to mark the time when a transaction started. This starting time is used to track how long a lock request has been active but not yet granted. The Storage Volume Reservation Table is updated when the Storage Volume Ownership Transaction establishes a lock.

Storage Volume Ownership Request (SVORQ)

The Storage Volume Ownership Request is a message sent from one controller to another controller requesting a change in the current Storage Volume Reservation Table. The Storage Volume Ownership Request uses the Lock Request Data Structure to contain information to send to another controller to establish a lock.

Lock Request Data Structure (LRDS)

The Lock Request Data Structure (LRDS) is a data structure that is sent as a message to another controller in order to establish a lock on a storage volume. The LRDS data structure includes a parameter identifying the starting sector for this lock region (startSector), a parameter identifying the number of sectors to force to disk and invalidate (numSectors), a parameter that provides a unique identifier to allow other controllers which received the lock requests to determine who made the request (Controller ID), a parameter used to uniquely identify which lock is being serviced (lockIdentifier) which also helps to keep track of a lock to a sequence number rather than having to determine which lock is being handled through the storageVolumeNumber and LockExtent parameters. It also includes a parameter that identifies the storage volume for which the lock is being requested (storageVolumeNumber), a parameter which identifies the type of lock being requested. Recall that the type of lock may be either RESERVATION, FULL, PARTIAL, or BLOCK.

The Primary Lock Request parameter (LockExtent primary) identifies the region of the storage volume which must be flushed before the host requests can be serviced by the requesting controller. The Secondary Lock Request parameter (LockExtent secondary) identifies the region of the storage volume which needs to be flushed before the lock can be coalesced with another lock (such as with a previously established partial lock) or before the entire data extent of the storage volume can be locked.

TABLE III

Exemplary pseudo-code for an embodiment of a Lock Request Data Structure typedef struct
{
 /* starting sector for this lock region */
 U32 startSector;
 /* number of sectors to force to disk and invalidate */
 U32 numSectors;
} LockExtent;
typedef enum
{
 RESERVATION,
 PARTIAL_LOCK
 BLOCKING_LOCK TABLE III-continued Exemplary pseudo-code for an embodiment of a Lock Request Data Structure } Lock Type;
typedef struct
{
 /*
 ** Controller ID is a unique identifier to allow
 ** other controllers which received the lock requests
 ** to determine who made the request
 U32 controllerID;
 ** The Lock Transaction Identifier is used to be able to
 ** uniquely identify which lock is being serviced. It helps
 ** to be able to keep track of a lock to a sequence
 ** number rather than having to determine which lock is
 ** been handled through the storageVolumeNumber, and LockExtent.
 */
 U32 lockIdentifier;
 /*
 ** This is the storage volume for which the
 ** lock is being requested
 */
 U32 storageVolumeNumber;
 /*
 ** The lock type identifies what type of lock is being
 ** requested
 */
 LockType reqType;
 /*
 ** Primary Lock Request
 ** This is the region which must be flushed before the
 ** host requests can be serviced
 */
 LockExtent primary;
 ** Secondary Lock Request
 ** This is a region which needs to be flushed before broth
 ** lock can be coalesced with another lock or before the
 ** entire data extent can be locked
 */
 LockExtent secondary;
} LockRequest;

Storage Volume Ownership Request (SVORQ)

The Storage Volume Ownership Response is a message that is sent in response to a Storage Volume Ownership Request message. The responses is always sent for every request received. The message contains data fields which pass back of the status of the request and the transaction value. The status of the request can be either "granted" or "rejected". The transaction value is used by the sender to track responses to their corresponding requests. The transaction value is copied from the received request.

Storage Volume Structure

Figure 6:
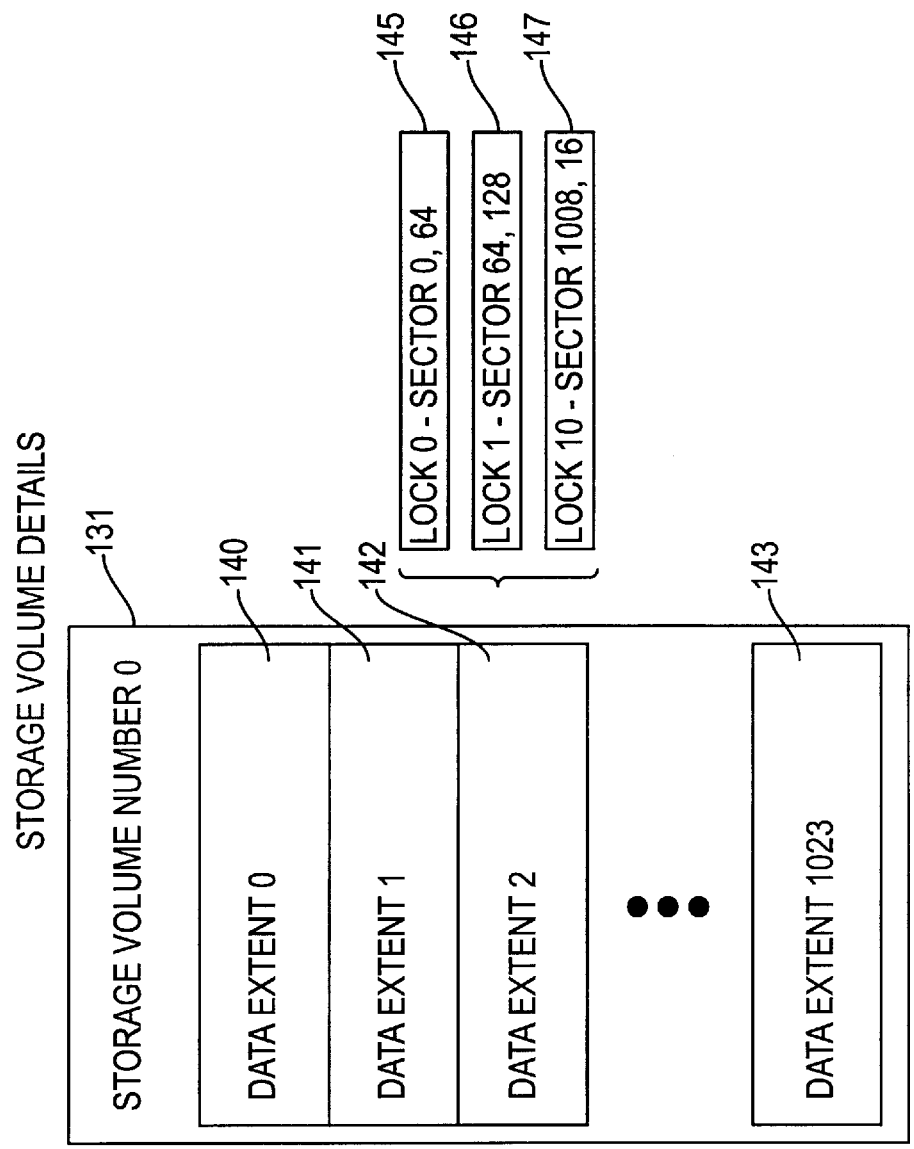
FIG. 6 is a diagrammatic illustration illustrating an exemplary storage volume structure.

We now describe in embodiment of a storage volume 131 of the current invention with respect to the diagrammatic illustration in FIG. 6. Advantageously, a user configuration tool (such as, for example the Global Array Manager configuration tool made by Mylex Corporation) is used during controller initialization to create the storage volume or volumes. Such an interactive process advantageously permits the user to create the appropriate size storage volume with desired redundancy attributes. Preferably, every storage volume 131 is assigned a unique number and all host accesses use that storage volume number to perform I/O operations, such as for example read and write operations (reads and writes).

In the embodiment illustrated in FIG. 6, the storage volume is assigned number zero ("0"). This storage volume has a total size of 512 MB which is broken up into 1024 data extents, each extent holding 1024 sectors, with each sector having 512 bytes. Those workers having ordinary skill in the art will appreciate that we storage volume around is described here are exemplary and that storage volume having a different total size and/or broken up into a different and number of data extents, sectors, and bytes may be used in conjunction with the inventive structure and method. The embodiment in FIG. 6 also illustrates an exemplary structure for the second data extent 142 having three outstanding locks 145, 146, 147. The first lock (lock 0) 145 is locking the first 64 blocks starting at sector 0. This is indicated by the notation "Lock 0—Sector 0,64". The second lock (Block 1) is locking 128 blocks starting at sector 64. The last lock (Lock 10) is locking the last 16 blocks.

Storage Volume Lock Coalescing

Figure 7:
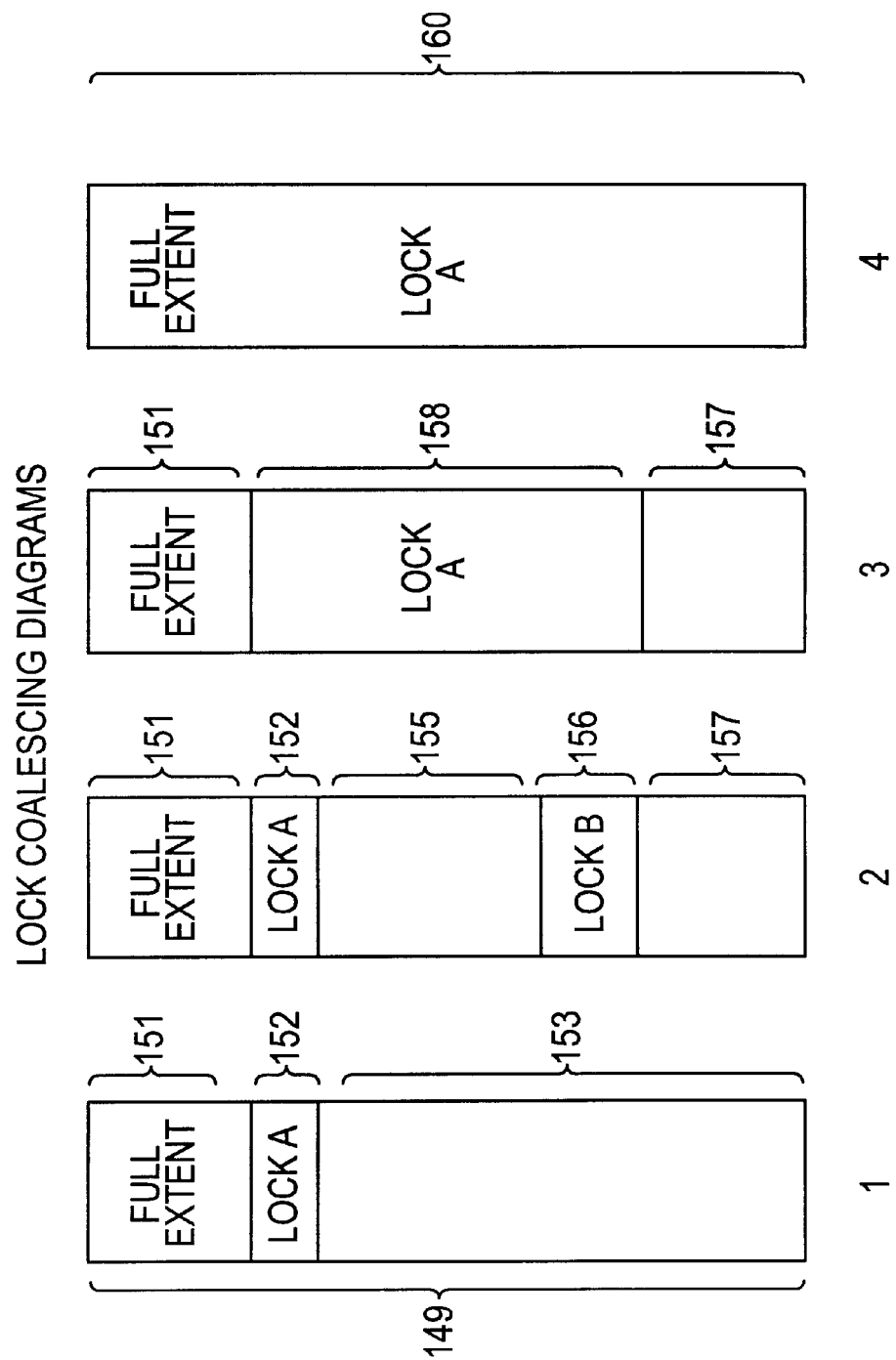
FIG. 7 is a diagrammatic illustration showing the relationships between locks and extents in a storage volume, where

The concept of Storage Volume Lock Coalescing is now described relative to the diagrammatic illustration of FIG. 7 (FIGS. 7A, 7B, 7C, and 7D). Lock coalescing occurs when multiple lock requests are done within a data extent to reduce the amount of time required to service a host request. As illustrated in FIG. 7, the lock extent 151 is defined to be the smallest amount of space a storage volume can be broken up into for a lock to be granted. This is done so that the total number of outstanding locks in the system can be kept to a manageable number.

When a second host request is made to a range of sectors which are contained within the data extents for which a lock request has already been made, the second host request is queued up to be alerted when lock is granted. One such case when this occurs is in a situation in which the first lock extent fully enveloped the second lock extent or when the first and second lock extents are equivalent. (Note that for simplification of the description, this description and FIG. 7 assumed that success the locks are not overlapping.) It is assumed for purposes of this discussion (but not as a limitation of the invention) that when the process begins (See FIG. 7A), one controller owned all the locks to the storage volume (Lock A), and that the other controller is attempting to perform a read operation or a write operation which requires obtaining ownership of a lock for a data extent.

We now describe the lock coalescing concept in greater detail with reference to FIGS. 7A–7D, each of which is a diagrammatic illustration of the same storage volume at a different time representing different or progressive lock and lock coalescing conditions. In FIG. 7A, the write has been accepted by a controller which then must obtain a lock before accepting the data. Lock A 152 has been requested but not yet granted and extents 151 and 153 have no locks. The manner in which Lock A has been established is now described. The lock request is sent to all other controllers in the system and includes two parts: (i) identification of the area which closely contains the data for which the request is made, and (ii) the full extent (which for purposes of this description will be referred to in as "Lock A"). In this particular embodiment, the initial piece of the lock may potentially be larger than the host's request to account for a full raid stripe. The full stripe is required for a RAID 5 write operation to be able to insure order to data needed to perform the parity calculation is consistent between controllers. (Recall that for a RAID 5 data stripe the parity data is contained with the data stripe.)

The primary lock region of Lock A's requests needs to be serviced in the least amount of time in order to insure rapid response to the host system. To service the lock request, cache lines which are contained within the primary lock region are placed at the head of the write-back queue to be sure they are processed first. The cache lines which are contained within the data extent, but not already handled through the primary lock region, are put on the write-back queue following the lines for the primary lock region. This initiates flushing of all data within the extent under the assumption that the controller which made the first lock request will more than likely make a further lock request. When all the data within the Lock A request range has been flushed, the lock grant can be sent to the requesting controller.

In FIG. 7B, the second write request has been received before Lock A has been granted. In this situation, the second lock request will be made for Lock B and will also include two parts: (i) the Lock B range, extent 156, and (ii) a second range of Sector 5, extent 155 (starting from the sector where Lock A request begins and ending at the end of the Lock B request). The cache lines which are contained within Lock B are placed on the write-back queue after the lines for the Lock A request to insure that the two lock requests are processed in proper order. The cache lines which are contained within the second range of sectors, extent 155, are placed on the write-back queue after the Lock B sectors. This procedure is followed since the second range is smaller than the range for the full extent. When the sectors from Lock B have been flushed, the lock is granted.

In FIG. 7C, the flush for the range between the Lock A and Lock B has been completed. In addition the flush for extent 155 has been completed. The extents 152, 155, and 156 that had been separate lock requests, are now coalesced into Lock A 158. This allows the range between Lock A and Lock B to be coalesced into a single lock, thereby limiting the number of outstanding locks which the controllers need to track. It sets and upper bound on the number of lock requests and outstanding locks to the number of outstanding I/O operations from the host system plus a number M, where M is a number of uncoalesced locks which can be present in the system at any one time.

In FIG. 7D, the full extent flush has taken place. Extent 160 represents the entire storage volume. All locks within the range are coalesced into a single data extent lock, that is, a full lock.

Read and Write Commands

Two types of commands that a host can use to access data on a Storage Volume are read and write commands. Each of these commands use an implicit reservation to ensure that the data accessed by the host is synchronized with the data recorded on the Storage Volume. The implicit reservations are represented by locks in the Storage Volume Reservation Table. A controller has an implicit reservation for a command if it has a lock whose extent encloses the extent associated with the Read or Write command.

Host System Read Request

Figure 8:
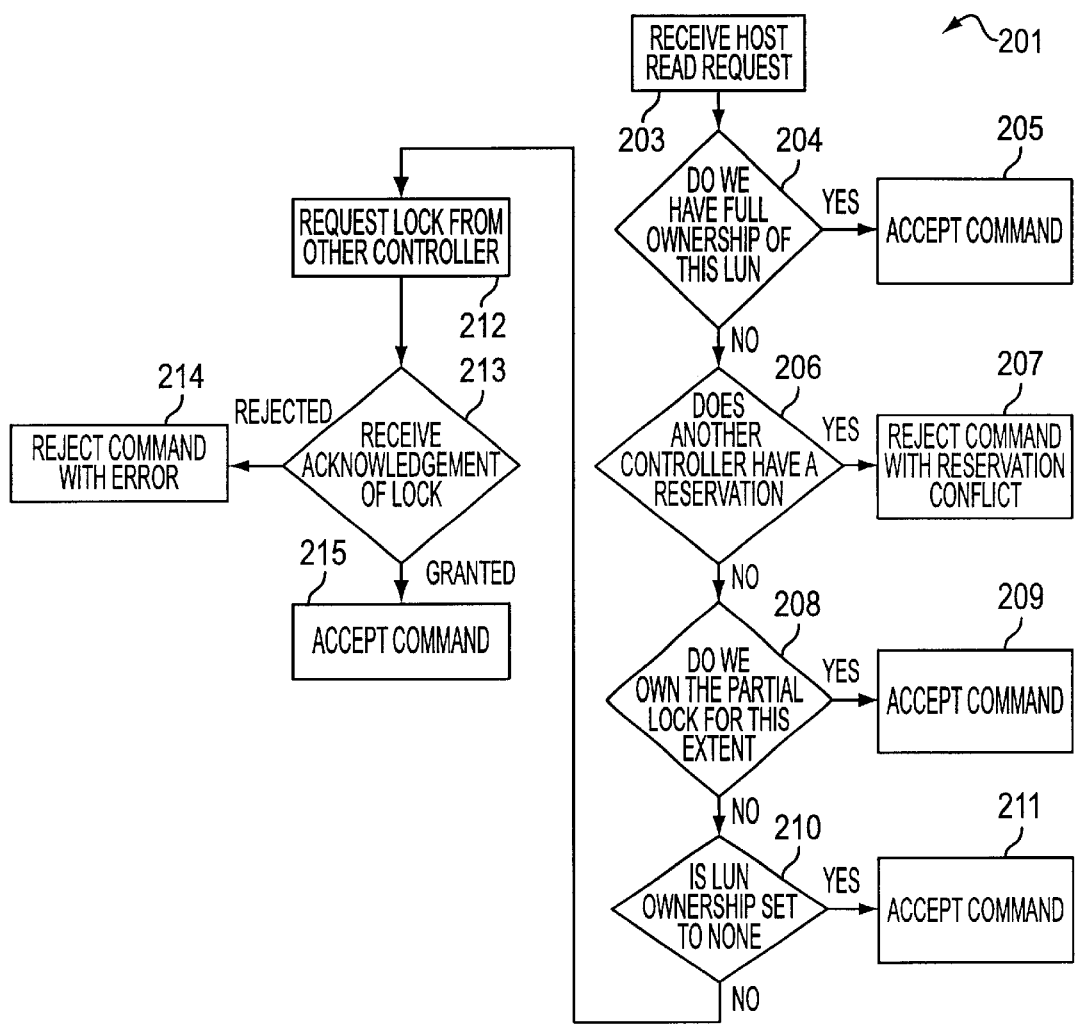
FIG. 8 is an diagrammatic flow-chart illustration showing an embodiment of a host read command processing procedure.

The controller activity in processing a Host Read Request is illustrated in FIG. 8. The Host Read Request procedure begins with the receipt by the controller of a Host Read Command (step 203). The Host Read Command is directed a Logical Unit (LU), identified by a Logical Unit Number (LUN), on the controller. The controller contains an internal mapping of which LUN represents which Storage Volume.

The controller checks the Storage Volume Reservation Table Volume State field for the Storage Volume identified by the LUN associated with the Host Request. In step 204, if the controller has a full ownership (as indicated by the FULL_LOCK bit being set in the Volume State field) the controller proceeds to accept the command and process the Host Request in step 205. If the controller does not have full ownership, the controller checks to see if another controller has a SCSI device reservation (step 206) by examining the REMOTE_RESERVATION bit of the Volume State field. If another controller has a SCSI device reservation, the controller rejects the Host Request (step 207).

The Host Read Request is a request for the controller to read user data from a specified extent on the Storage Volume. The next step (208) for the controller is to check if the controller owns a partial lock which covers the extent associated with the Host Read Request. This is a two step process. First the controller examines the PARTIAL_LOCK bit of the Volume State field to determine if the controller owns any partial locks. If the controller owns a partial lock, then the controller examines the locks in the hash table of locks to see if a lock that it owns encloses the extent associated with the Host Read Request. If the controller owns an enclosing lock, the controller proceeds to Accept Command (step 209). If the controller does not own an enclosing lock, the controller must request a lock from the other controller (step 212). When the controller receives the acknowledgment that the lock has been granted (step 213) the controller proceeds to Accept Command (step 215). The granted lock is added to the hash table of locks for the controller. If no locks have previously been established by the controller, the PARTIAL_LOCK bit is set in the Volume State field of the Storage Volume Reservation Table. If the controller's lock request is rejected, the controller reports the error to the host (step 214) and terminates the Host Read request.

Host System Write Request

Figure 9:
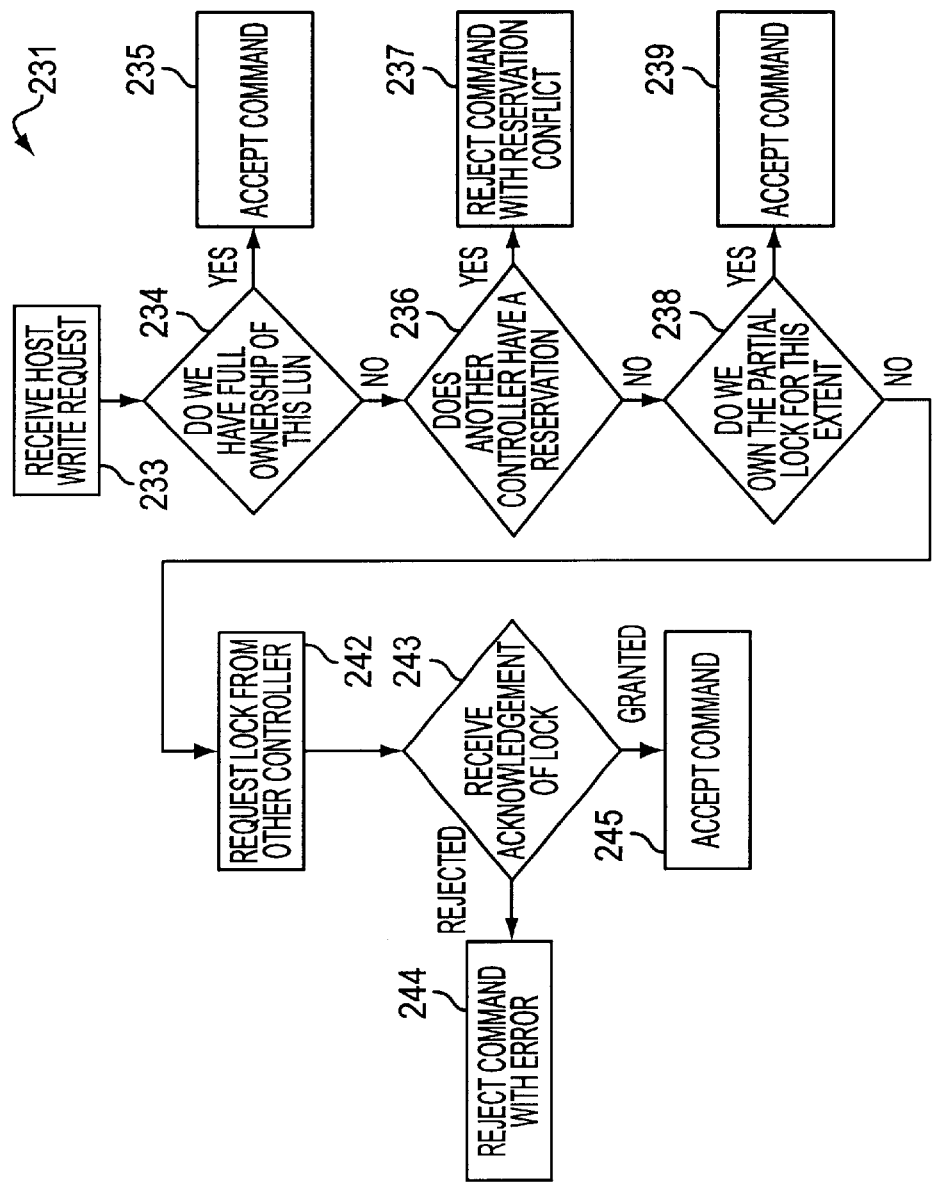
FIG. 9 is an diagrammatic flow-chart illustration showing an embodiment of a host write command processing procedure.

The controller activity in processing a Host Write Request is illustrated in FIG. 9. The Host Write Request procedure begins with the receipt by the controller of a Host Write Command (step 233). The Host Write Command is directed a Logical Unit (LU), identified by a Logical Unit Number (LUN), on the controller. The controller contains an internal mapping of which LUN represents which Storage Volume.

The controller checks the Storage Volume Reservation Table Volume State field for the Storage Volume identified by the LUN associated with the Host Request. In step 234, if the controller has a full ownership (as indicated by the FULL_LOCK bit being set in the Volume State field) the controller proceeds to accept the command and process the Host Request (step 235). If the controller does not have full ownership, the controller checks to see if another controller has a SCSI device reservation (step 236) by examining the REMOTE_RESERVATION bit of the Volume State field. If another controller has a SCSI device reservation, the controller rejects the Host Request (step 237).

The Host Write Request is a request for the controller to write user data from a specified extent on the Storage Volume. The next step (step 238) for the controller is to check if the controller owns a partial lock which covers the extent associated with the Host Write Request. This is a two step process. First the controller examines the PARTIAL_LOCK bit of the Volume State field to determine if the controller owns any partial locks. If the controller owns a partial lock, then the controller examines the locks in the hash table of locks to see if a lock that it owns encloses the extent associated with the Host Write Request. If the controller owns an enclosing lock, the controller proceeds to Accept Command (step 239). If the controller does not own an enclosing lock, the controller requests a lock from the other controller (step 242). When the controller receives the acknowledgement that the lock has been granted (step 243) the controller proceeds to Accept Command (step 245). The granted lock is added to the hash table of locks for the controller. If no locks have previously been established by the controller, the PARTIAL_LOCK bit is set in the Volume State field of the Storage Volume Reservation Table. If the controller's lock request is rejected, the controller reports the error to the host (step 214) and terminates the Host Write request.

Accept Command Procedure

Figure 10:
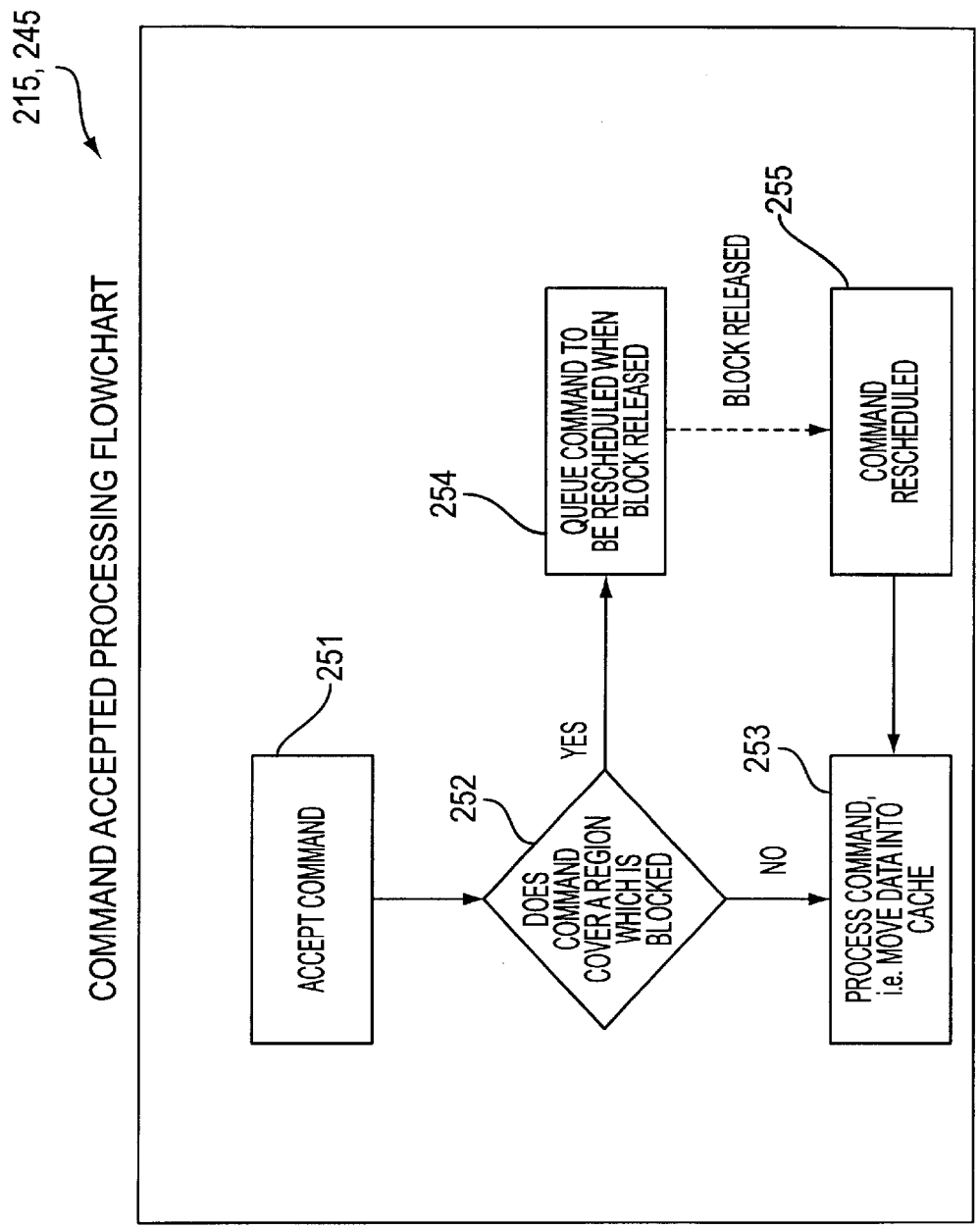
FIG. 10 is an diagrammatic flow-chart illustration showing an embodiment of a command accepted processing procedure.

We now describe embodiment of the Accept Command procedure 251 (see Step 215 for the host read command processing and Step 245 for the host write command processing procedures) relative to the flow-chart in FIG. 10. In this procedure after a lock has been granted, the controller which now always lock must ensure that a Blocking Lock is also not present for the region in which the I/O operation is taking place. One controller can own a Partial Lock for region at the same time that a different controller owns a Blocking Lock for the same region. If a command is accepted (Step 251) the controller performs a test determine if the command covers an extent or region which is blocked (Step 252), and if the determination indicates that the command does not cover a region which is blocked, the command may continue to be processed and may move data into the cache (Step 253); and if the test indicates that the command does cover a region which is blocked, then the controller queues the command to be rescheduled when the block of region has been released (Step 254). After the lock has been released (Step 255) the controller may then process the command (Step 253).

SCSI Reserve and Release Commands

Use of the SCSI Reserve and Release commands are only one exemplary implementation of a Host Computer to Peripheral interface for controlling access to Host data stored on the peripheral. Those workers having ordinary skill in the art in light of the description provided herein will appreciate that the inventive structure and method are applicable to provide access control for interfaces other than SCSI.

As already described relatice to the Read and Write commands, the host identifies the Storage Volume to which the command is directed through the use of a Logical Unit Number (LUN).

SCSI Reserve Command

Figure 11:
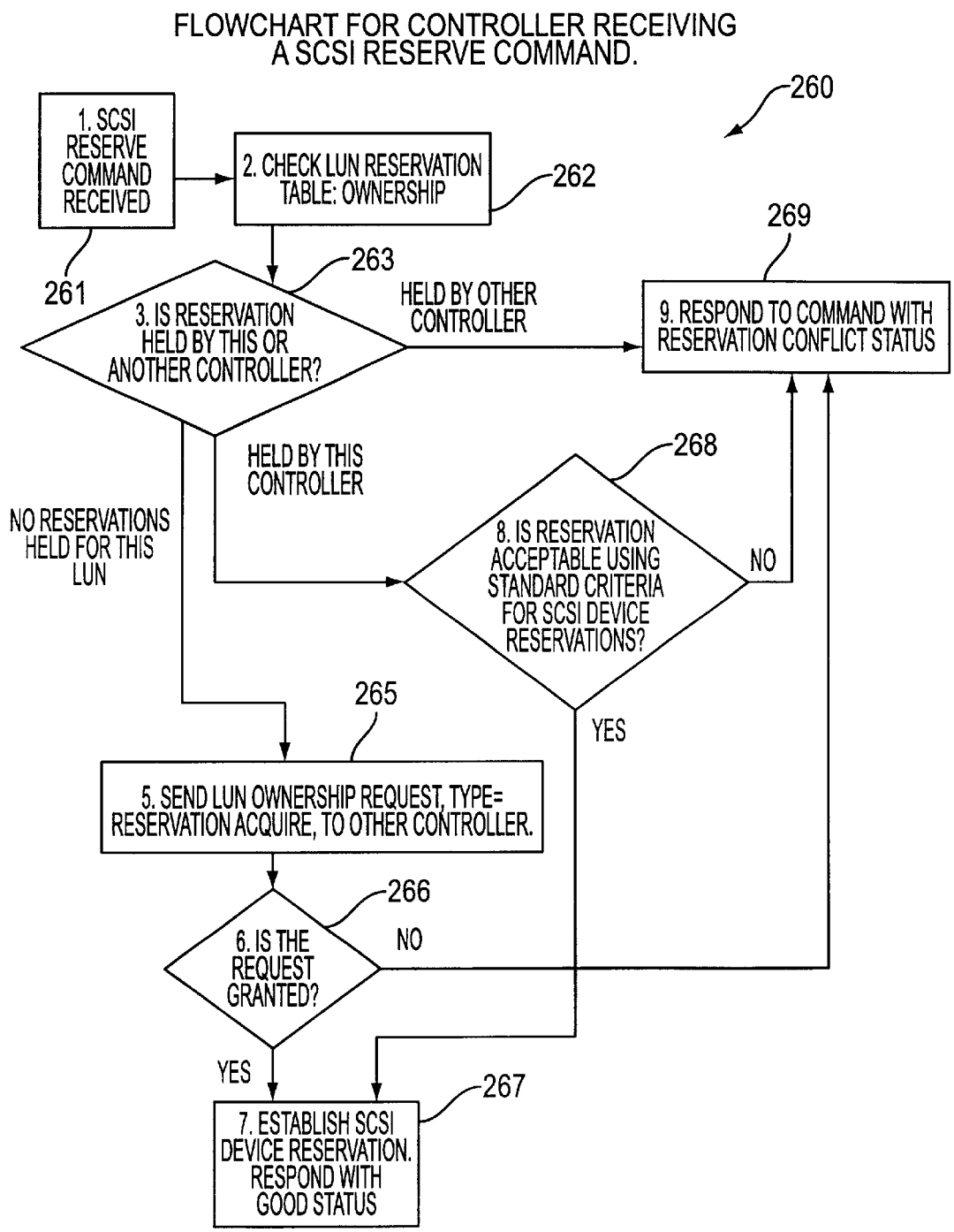
FIG. 11 is an illustration showing an embodiment of a procedure performed by a controller in response to receiving a SCSI Reserve command.

One embodiment of a procedure for processing for the SCSI Reserve command is illustrated in FIG. 11. The SCSI Reserve command is received (step 261). The controller checks the Volume State field of the Storage Volume reservations Table for the Storage Volume associated with the LUN (steps 262 and 263). If the REMOTE_RESERVATION bit in the Volume State field indicates that the reservation is held by another controller, the SCSI Reserve command is rejected (step 269). If the reservation is held by this controller as indicated by the LOCAL_RESERVATION bit in the Volume State field, the controller uses the standard SCSI criteria (step 268) for determining whether to establish the reservation (step 267) or to reject the reservation request (step 269). If the controller determines (step 263) that no SCSI device reservations are in effect, it sends a Storage Volume Ownership Request to other controllers with the type field of the Lock Request Data Structure set to RESERVATION (step 265). If the other controller grants the request (steps 266 and 267) this controller establishes the SCSI Reservation and informs the Host that the command has completed successfully. If the other controller rejects the request (steps 266 and 269) this controller reports an error to the host that originated the SCSI Reserve command.

SCSI Release Command

Figure 12:
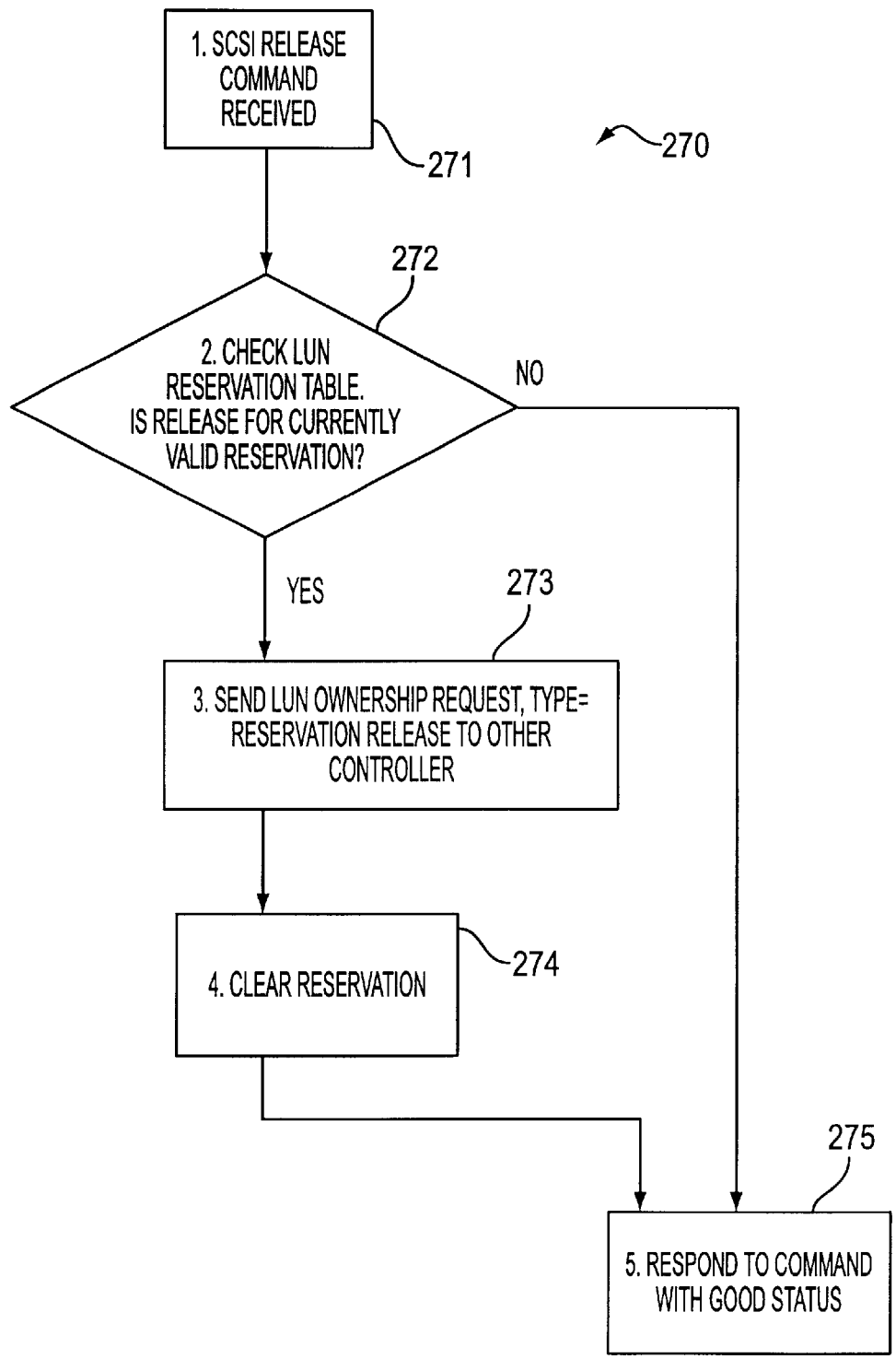
FIG. 12 is an diagrammatic flow-chart illustration showing an embodiment of a procedure performed in response to the receipt of a SCSI Release command.

One embodiment of a procedure for processing for the SCSI Release command is illustrated in FIG. 12. The SCSI Release command is received (step 261). The controller checks the Volume State field of the Storage Volume reservations Table for the Storage Volume associated with the LUN (step 272). If the reservation is held by this controller as indicated by the LOCAL_RESERVATION bit in the Volume State field, the controller notifies the other controllers via a Storage Volume Ownership Request that indicates that the reservation is being released (step 273). This controller then clears the LOCAL_RESERVATION bit (step 274) and tells the Host that the command has completed successfully (step 275). If the LOCAL_RESERVATION bit is not set (step 272) then the controller performs no action but tells the host that the command has completed successfully.

Figure 13:
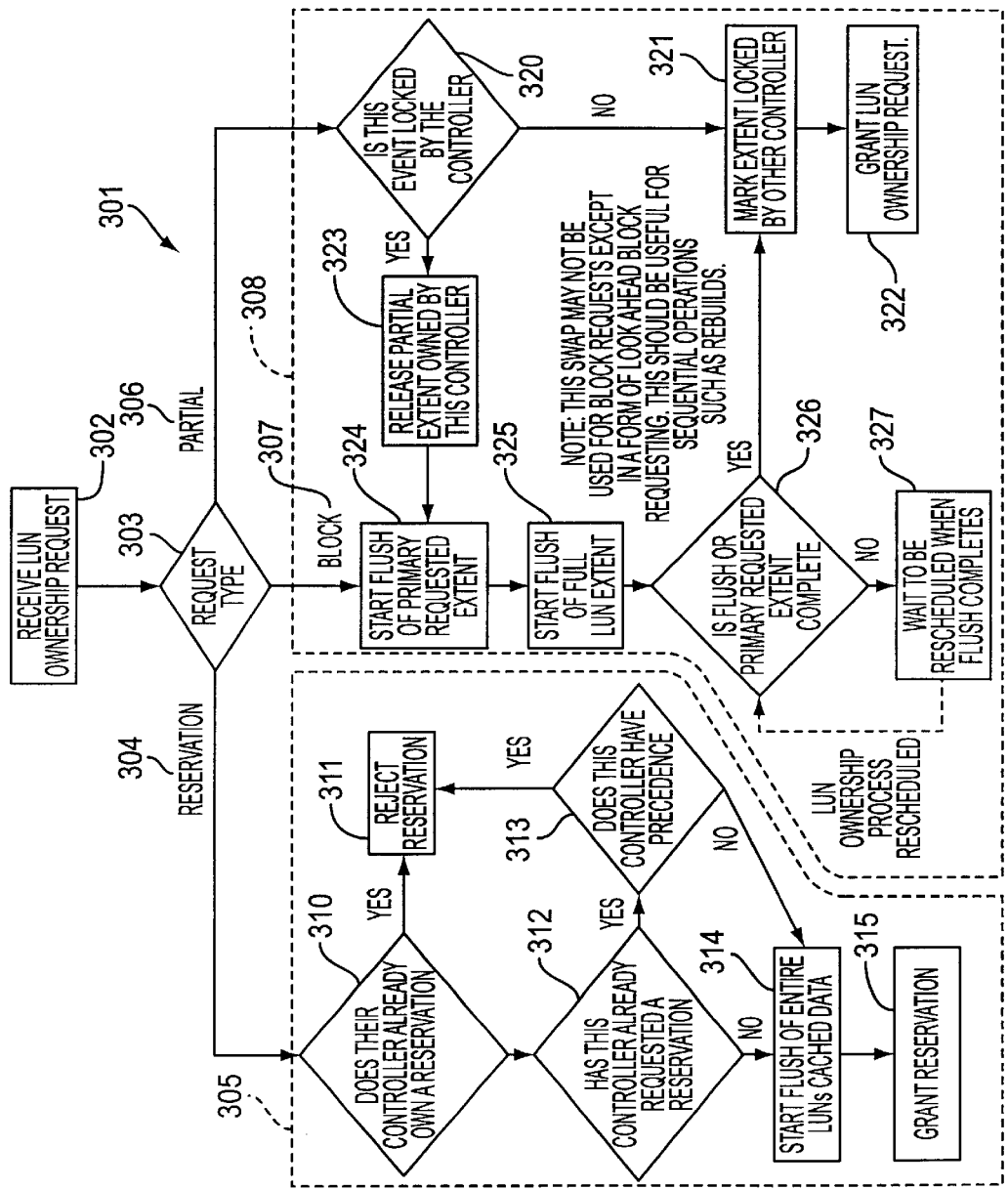
FIG. 13 is an diagrammatic flow-chart illustration showing an embodiment of a procedure performed in response to a Storage Volume Ownership Request Command.

The Storage Volume Ownership Request process 301 which takes place when a controller receives a Storage Volume Ownership Request is now described relative to the diagrammatic flowchart of FIG. 13.

When a controller receives a Storage Volume Ownership Request (LUN Ownership Request) (Step 302), the process 301 determines the request type from the type field of the Lock Request Data Structure (Step 303). In this embodiment request type may be either "reservation" 304, "partial" 306, or "block" 307. The reservation 304 type request is processed by some process 305. Having determined that the request type is "reservation" the determination is made as to whether this particular controller already owns a reservation (Step 310), if it does, then the new reservation is rejected (Step 311); and if it does not, a further determination is made as to whether this controller has already requested a reservation (Step 312), and if it passed, if further test is performed to determine if this controller has precedence (Step 313). If this controller has precedence then the reservation is rejected (Step 311) as before. However, if this controller does not have precedence (Step 313) or this controller has not already requested a reservation (Step 312), then the flush of the entire Storage Volume's cached data is initiated (Step 314), and the reservation is granted (Step 315).

The sub-process 308 followed when the request type is either "partial" or "block" is now described. If the request type (Step 303) is partial, then a determination is made as to whether this extent is locked by this controller (Step 320), and if it is not locked, the extent locked by the other controller is marked (Step 321) and the Storage Volume ownership request is granted (Step 322). On the other hand if this extent is locked by this controller (Step 320) then the partial extent owned by this controller (Step 323) is released and a flush of the primary requested extent (Step 324) is started. The flush of the primary requested extent is also initiated if the request type (Step 303) is "block". From this point the processing for request type partial or block is the same. After the initiation of the flush of primary requested extent (Step 324), we start the optional flush of the full LUN extent (Step 325). (This step of flushing the full LUN extent is not generally used for block requests.) We then determine if the flush of the primary requested extent is complete (Step 326), and if this complete we marked the extent locked by the other controller (Step 321) and grant the Storage Volume Ownership request (Step 322). Otherwise we wait to be rescheduled, by repeating the test (Step 326), when the flush completes (Step 327).

In FIGS. 14–26 illustrate objects and an object oriented design of one particular specific implementation of the invention. Many of the features, rules, procedures, and definitions are specific to this particular embodiment of the invention and are not to be attributed as being requirements of all embodiments or of limitations on the scope or breadth of the claims, but rather as being illustrative of the manner in which a particular embodiment was implemented. We now describe each of these embodiments in greater detail with reference to Table IV and FIGS. 14–26.

Figure 14:
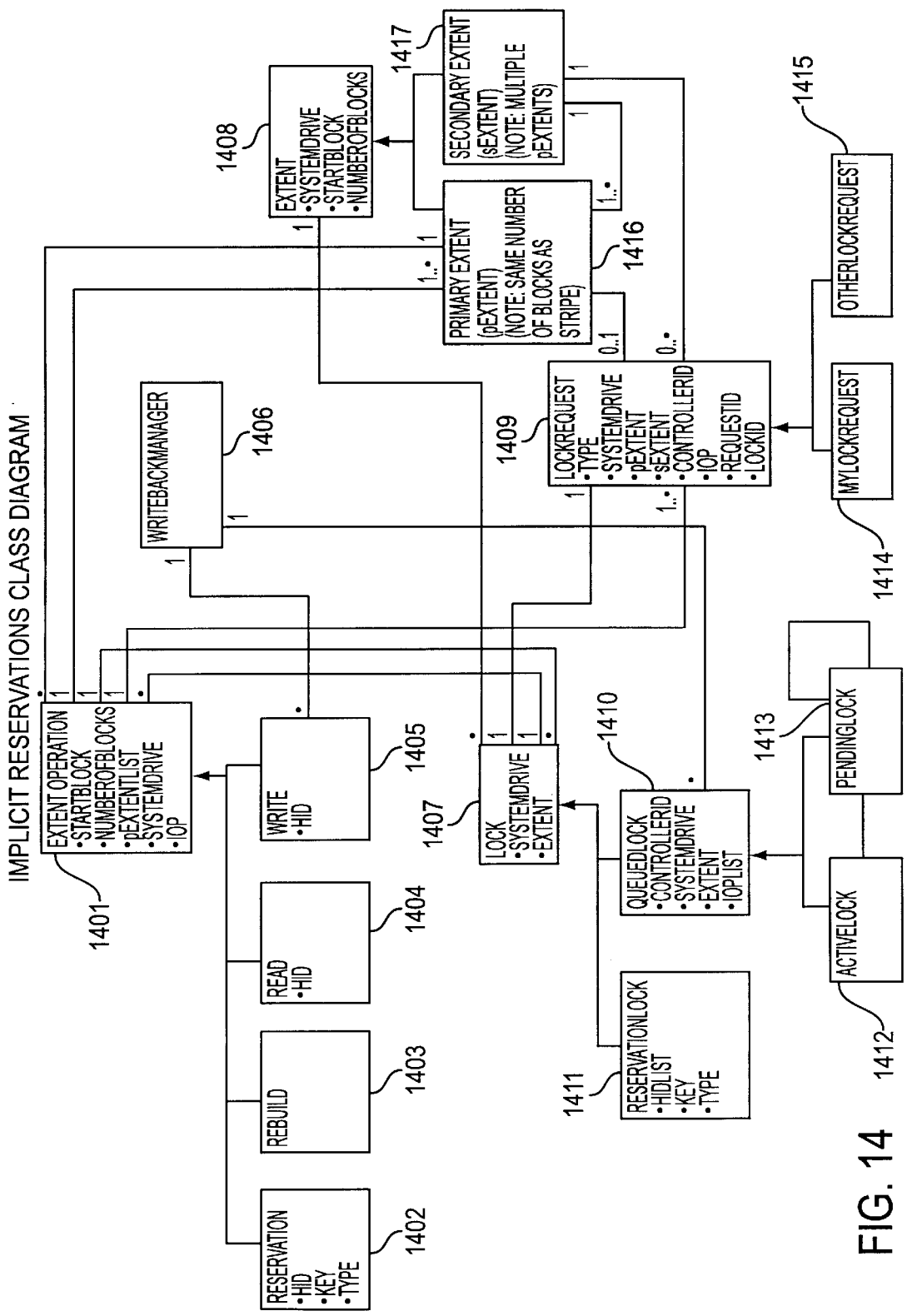
FIG. 14 is an illustration, in the form of an object relationship diagram, showing one embodiment of the manner in which the mechanism or procedure for maintaining cache consistency could be implemented.

FIG. 14 is an illustration, in the form of an object relationship diagram, showing one embodiment of the manner in which the mechanism or procedure for maintaining cache consistency could be implemented. It shows the objects used in the design and their relationship to each other.

Figure 15A:
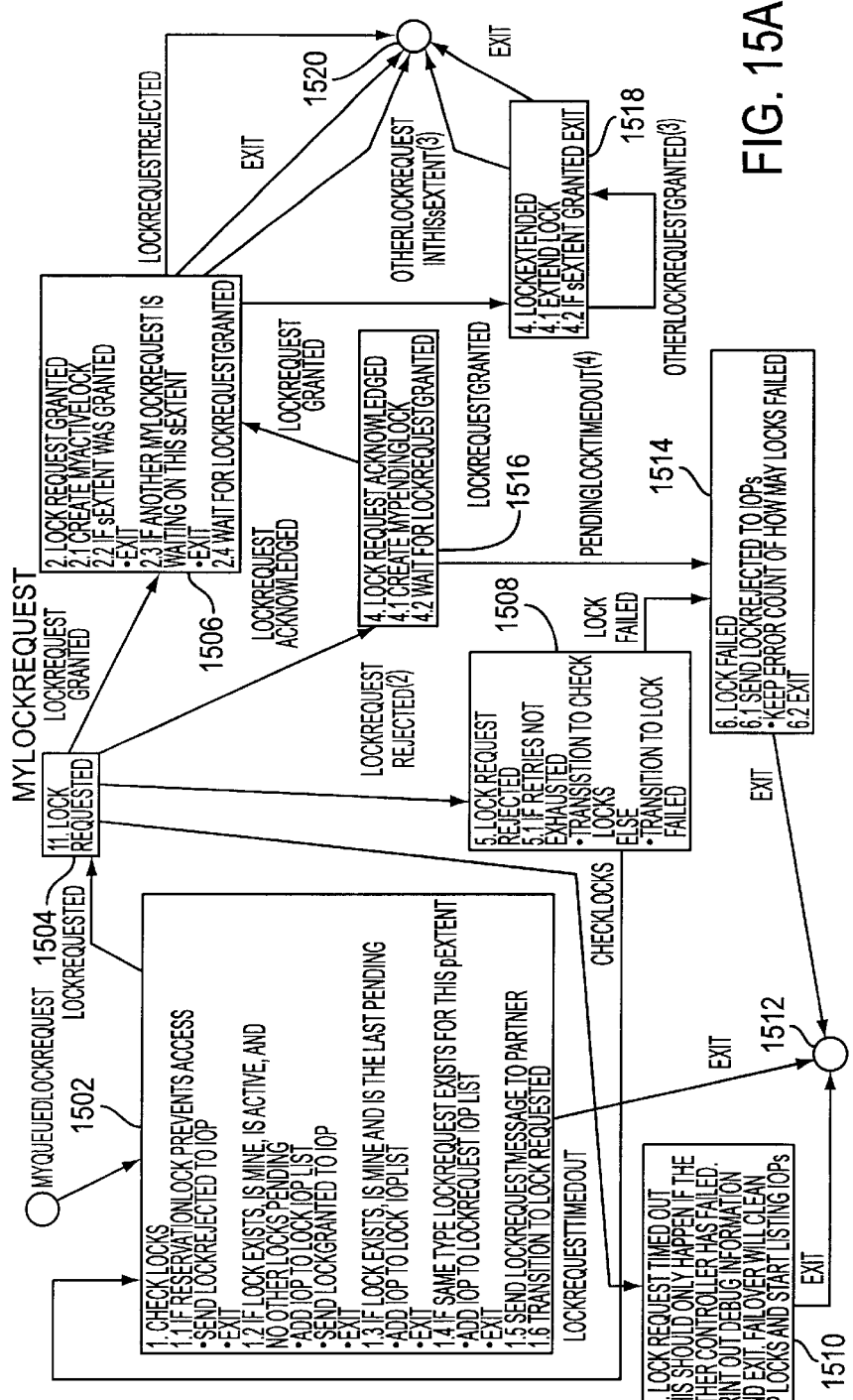
FIG. 15 is an illustration showing an exemplary state transition diagram for a my lock request (MyLockRequest) object.
Figure 15B:
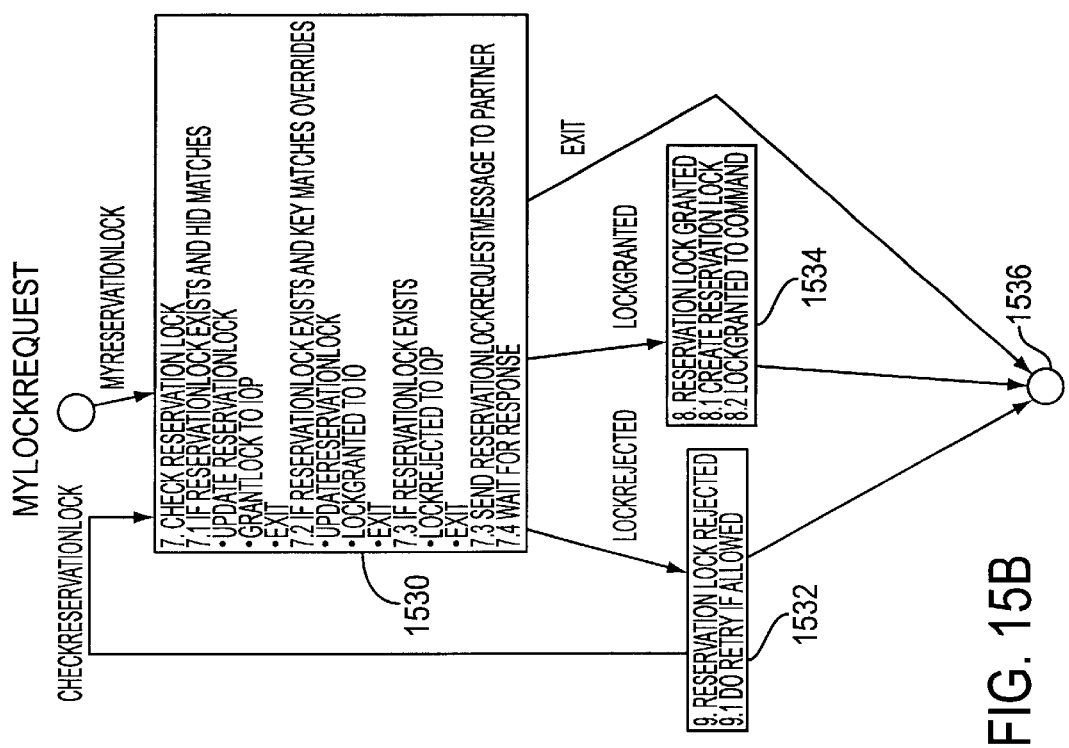
Figure 16:
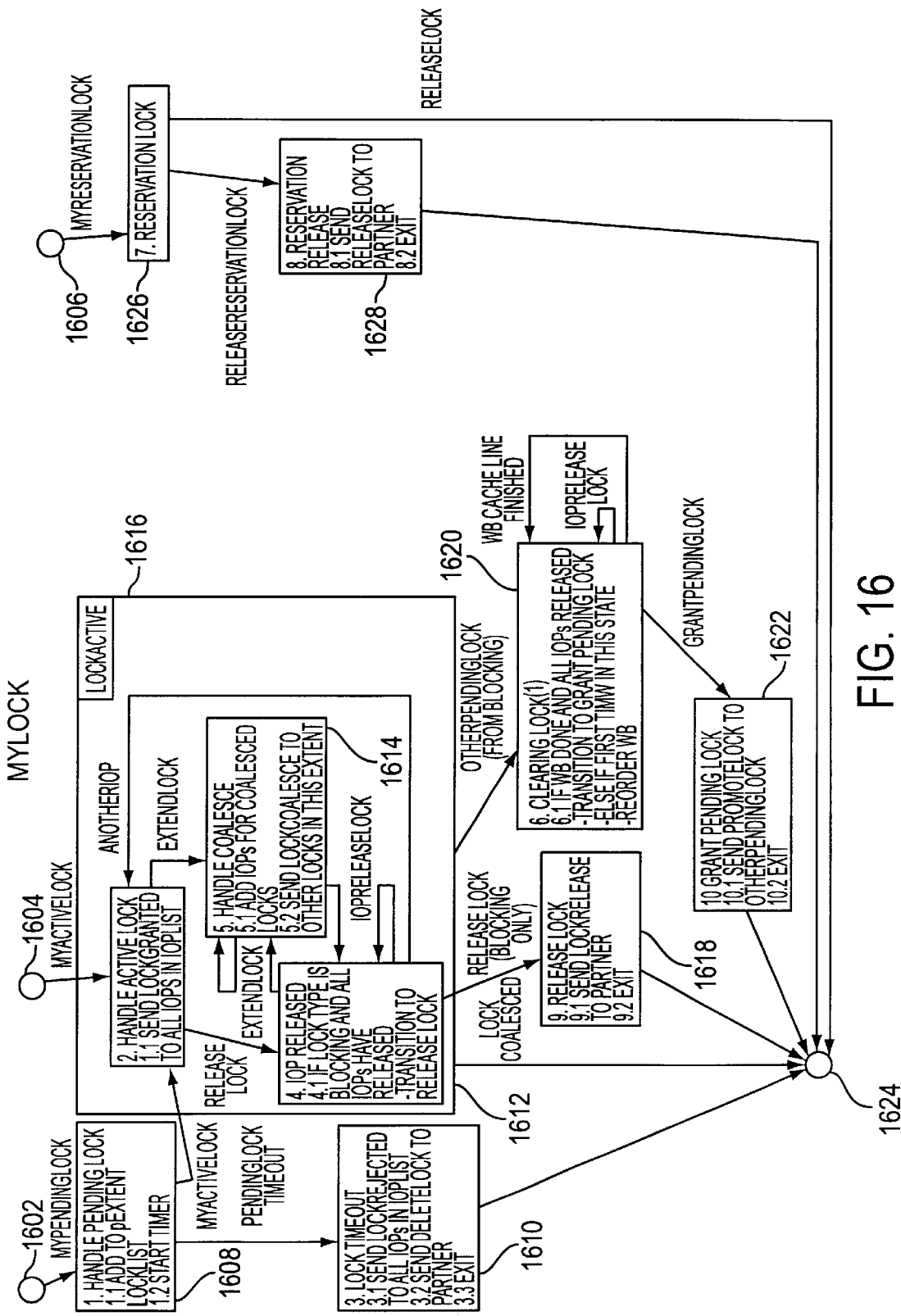
FIG. 16 is an illustration showing an exemplary state transition diagram for a my lock request (MyLockRequest).
Figure 17:
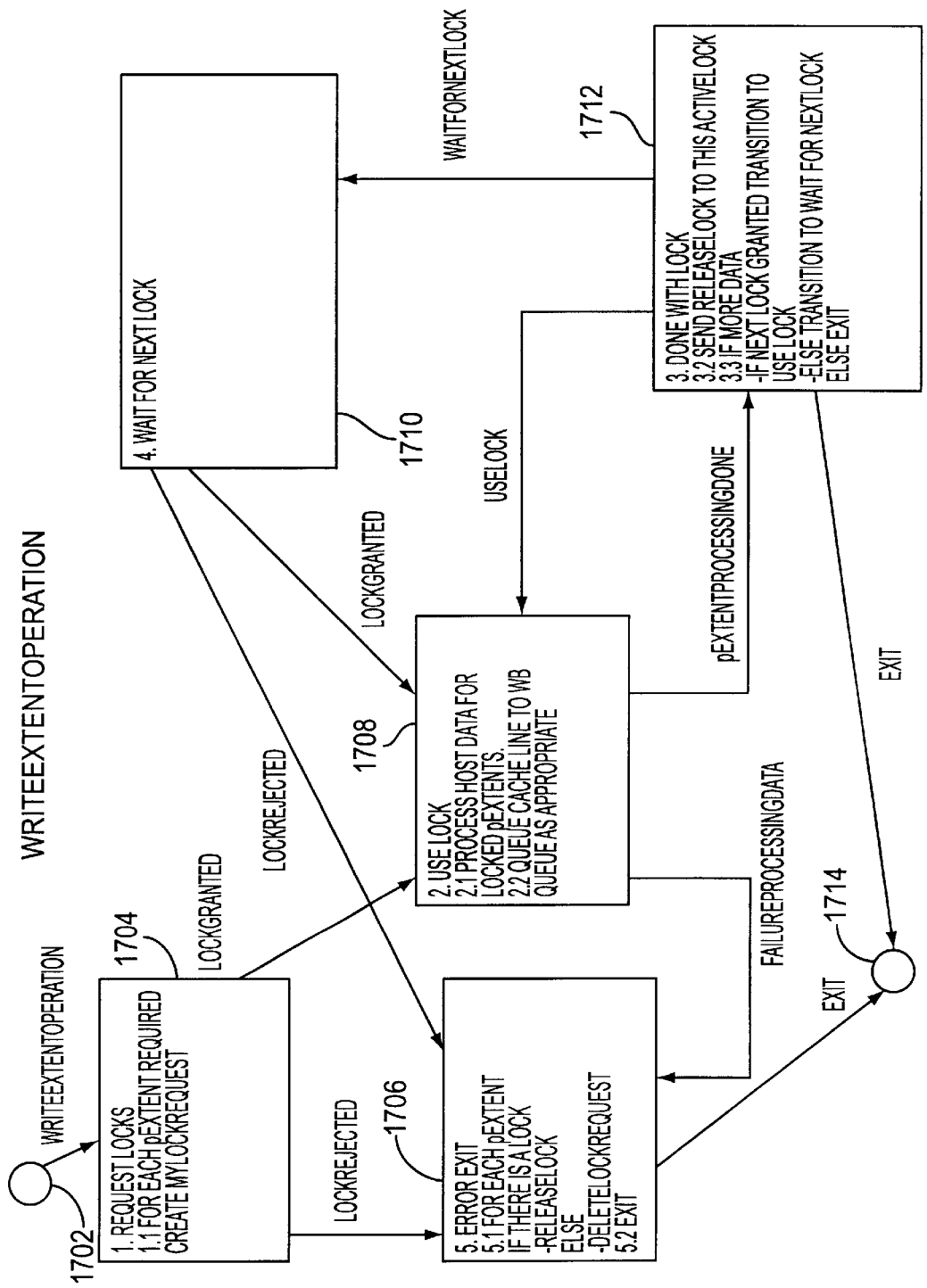
FIG. 17 is an illustration showing an exemplary state transition diagram for the write extent operation (WriteExtentOperation).
Figure 18:
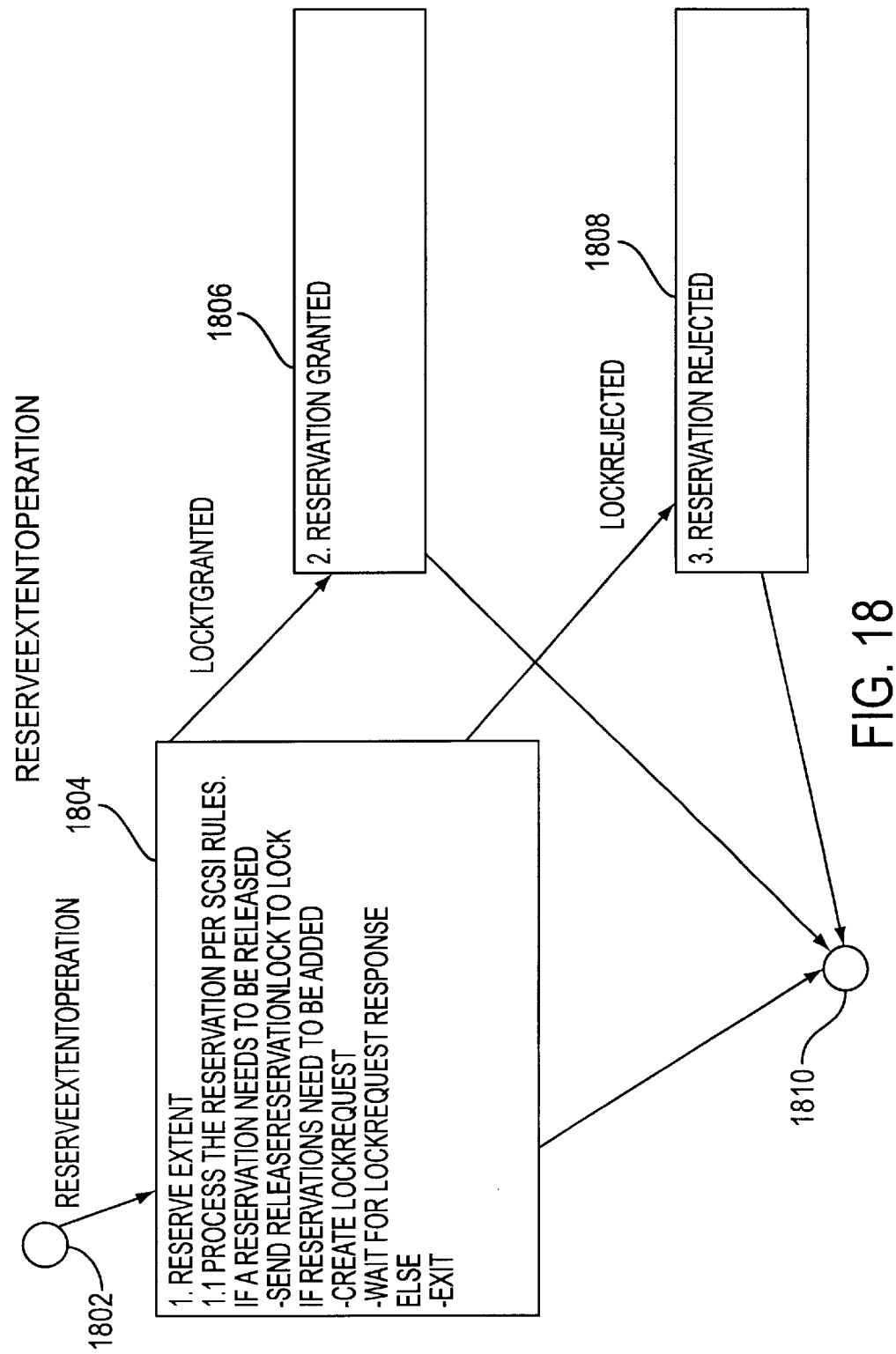
FIG. 18 is an illustration showing an exemplary state transition diagram for the reserve extent operation (ReserveExtentOperation).
Figure 19:
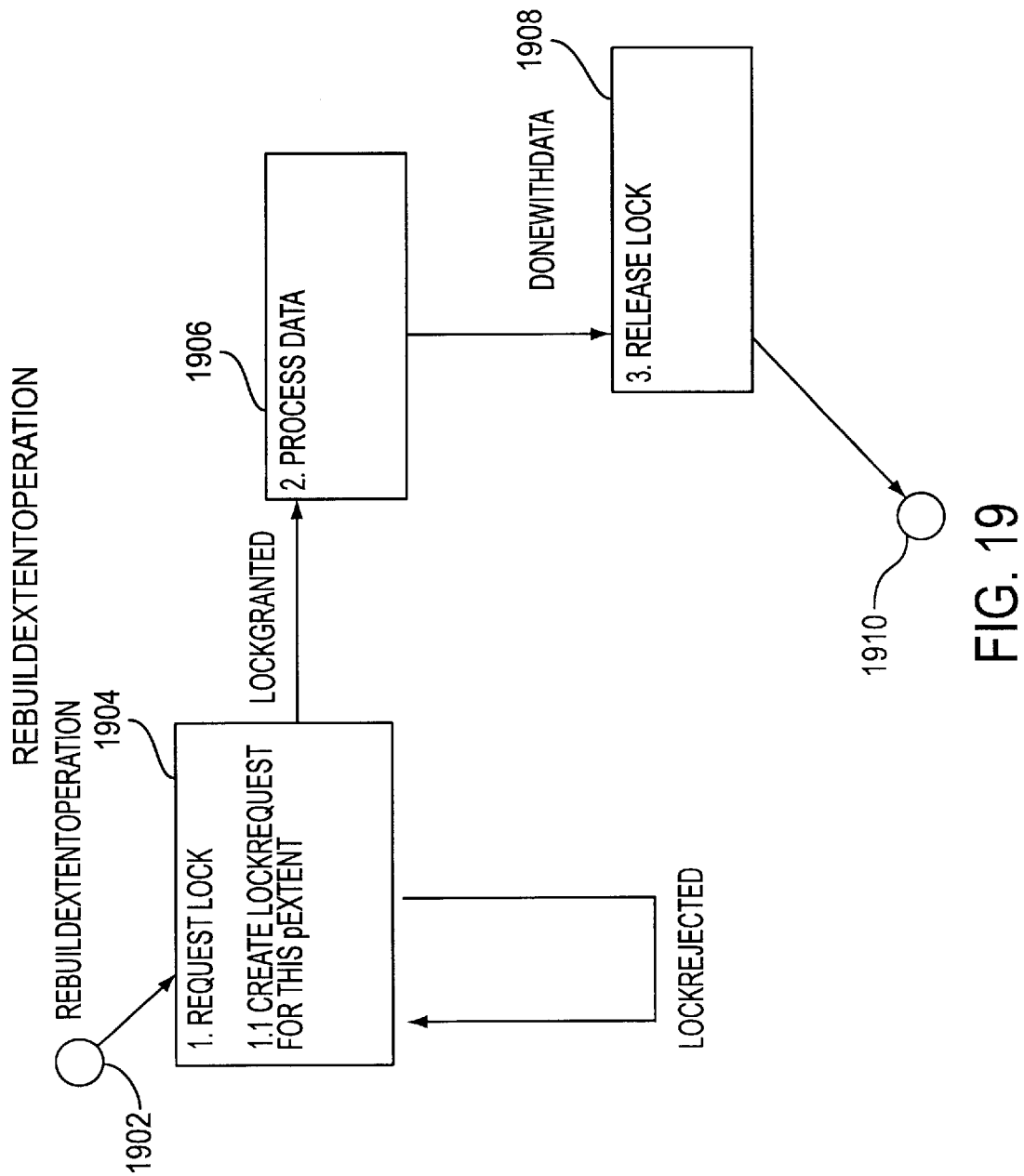
FIG. 19 is an illustration showing an exemplary state transition diagram for the rebuild extent operation (RebuildExtentOperation).
Figure 20:
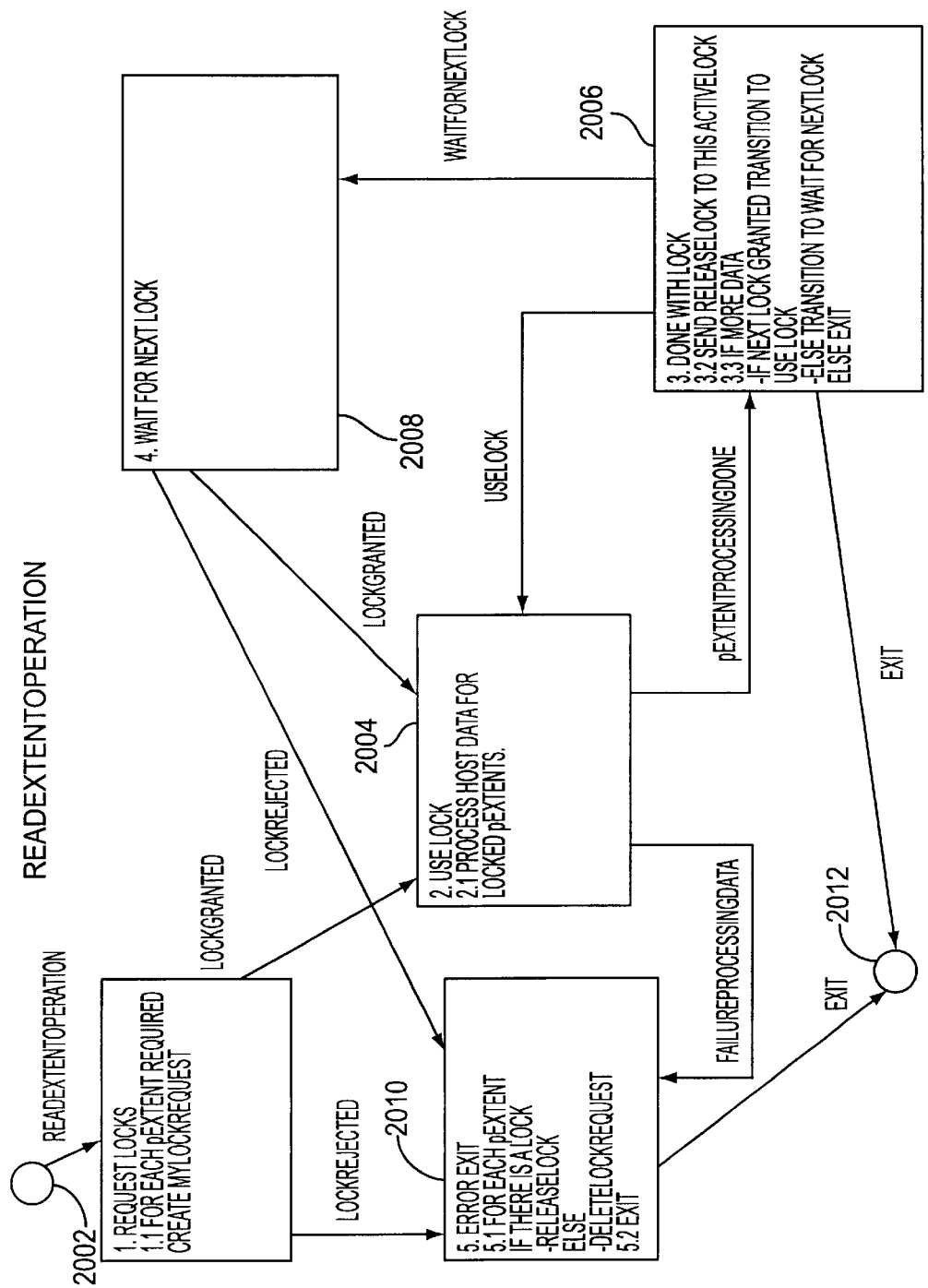
FIG. 20 is an illustration showing an exemplary state transition diagram for the read extent operation (ReadExtentOperation).
Figure 21:
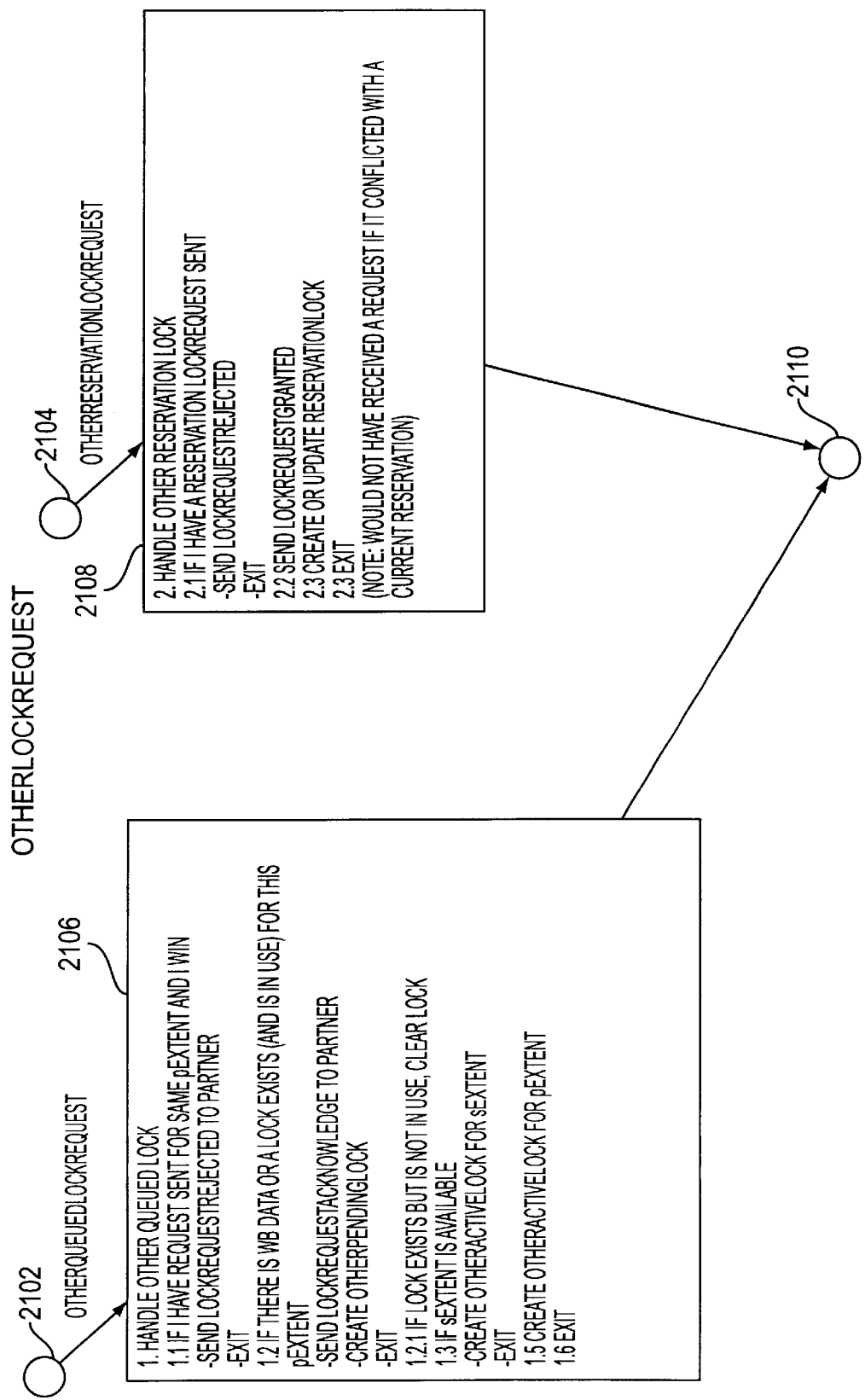
FIG. 21 is an illustration showing an exemplary state transition diagram for the other lock request (OtherLockRequest).
Figure 22:
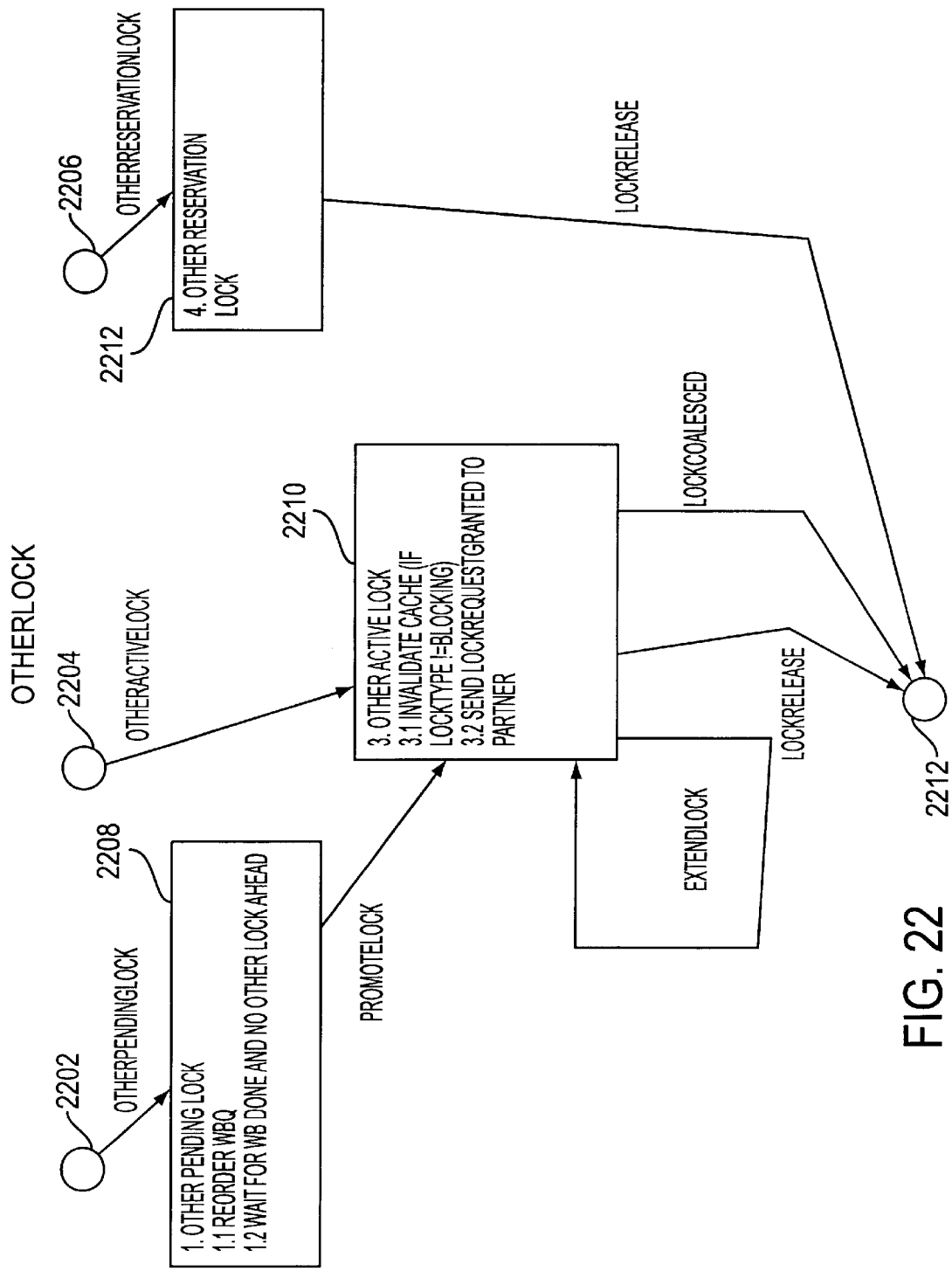
FIG. 22 is an illustration showing an exemplary state transition diagram for the other lock (OtherLock).
Figure 23:
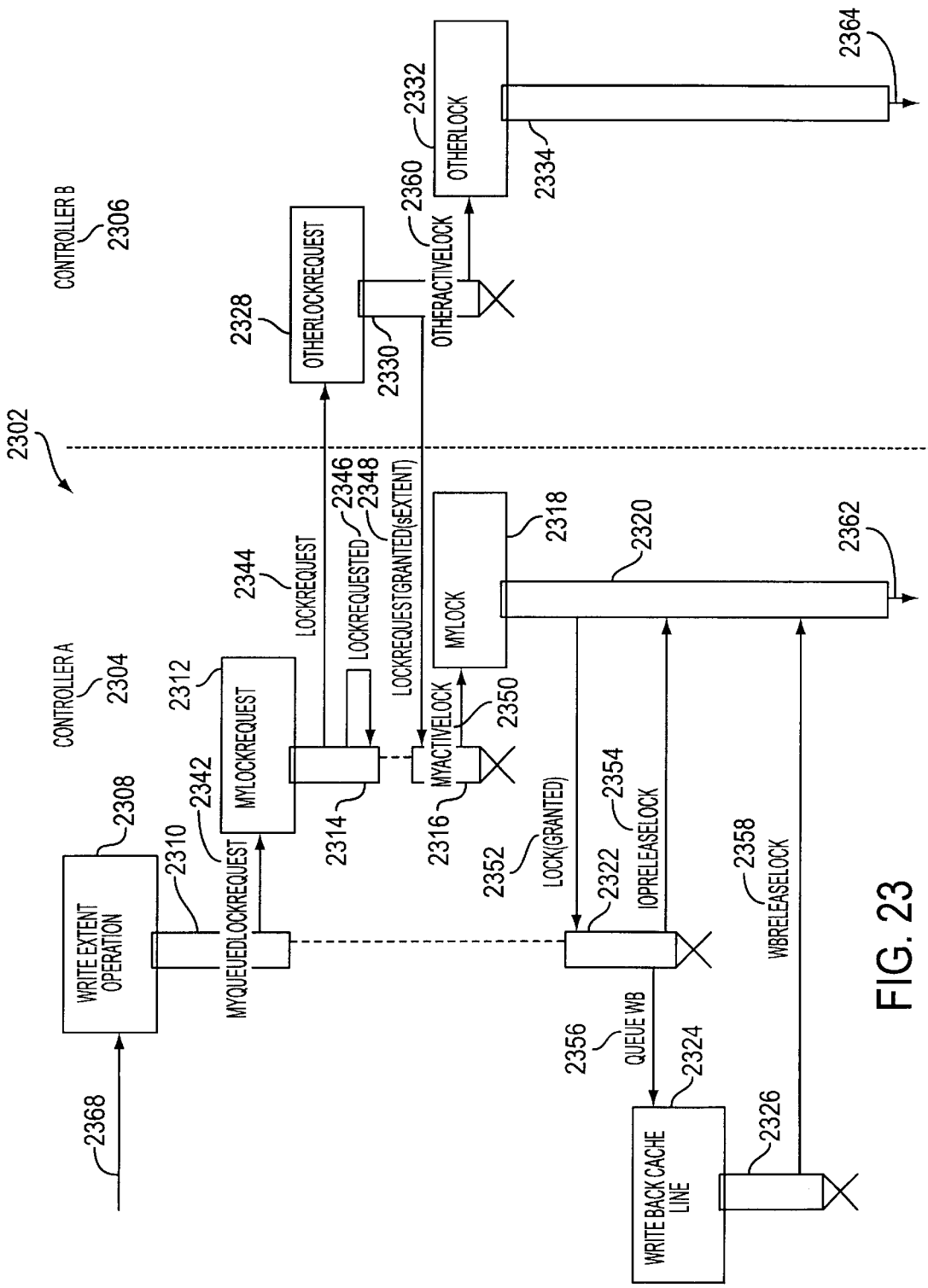
FIG. 23 is an illustration showing an exemplary sequence diagram for a write command.
Figure 24:
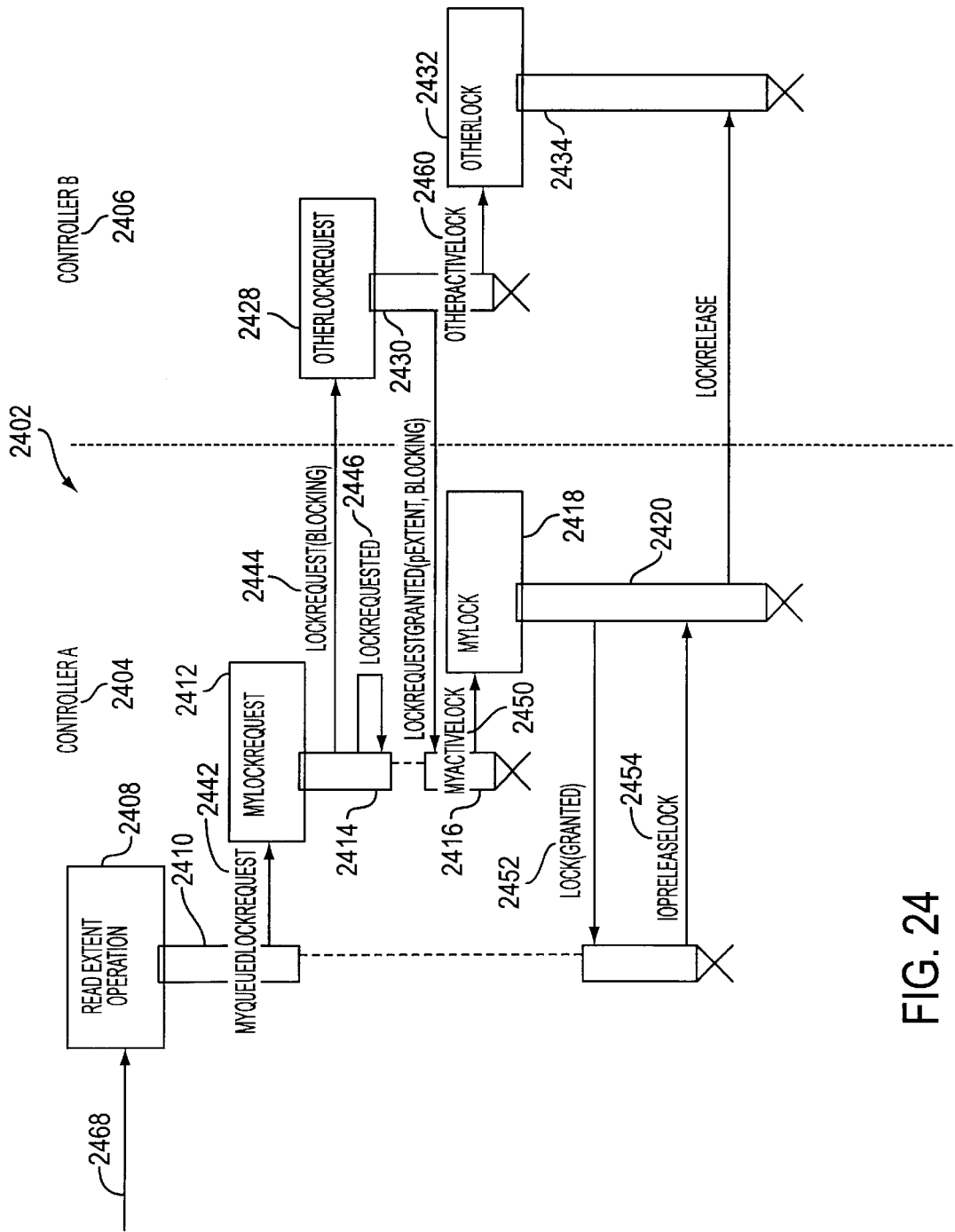
FIG. 24 is an illustration showing an exemplary sequence diagram for a read command.
Figure 25:
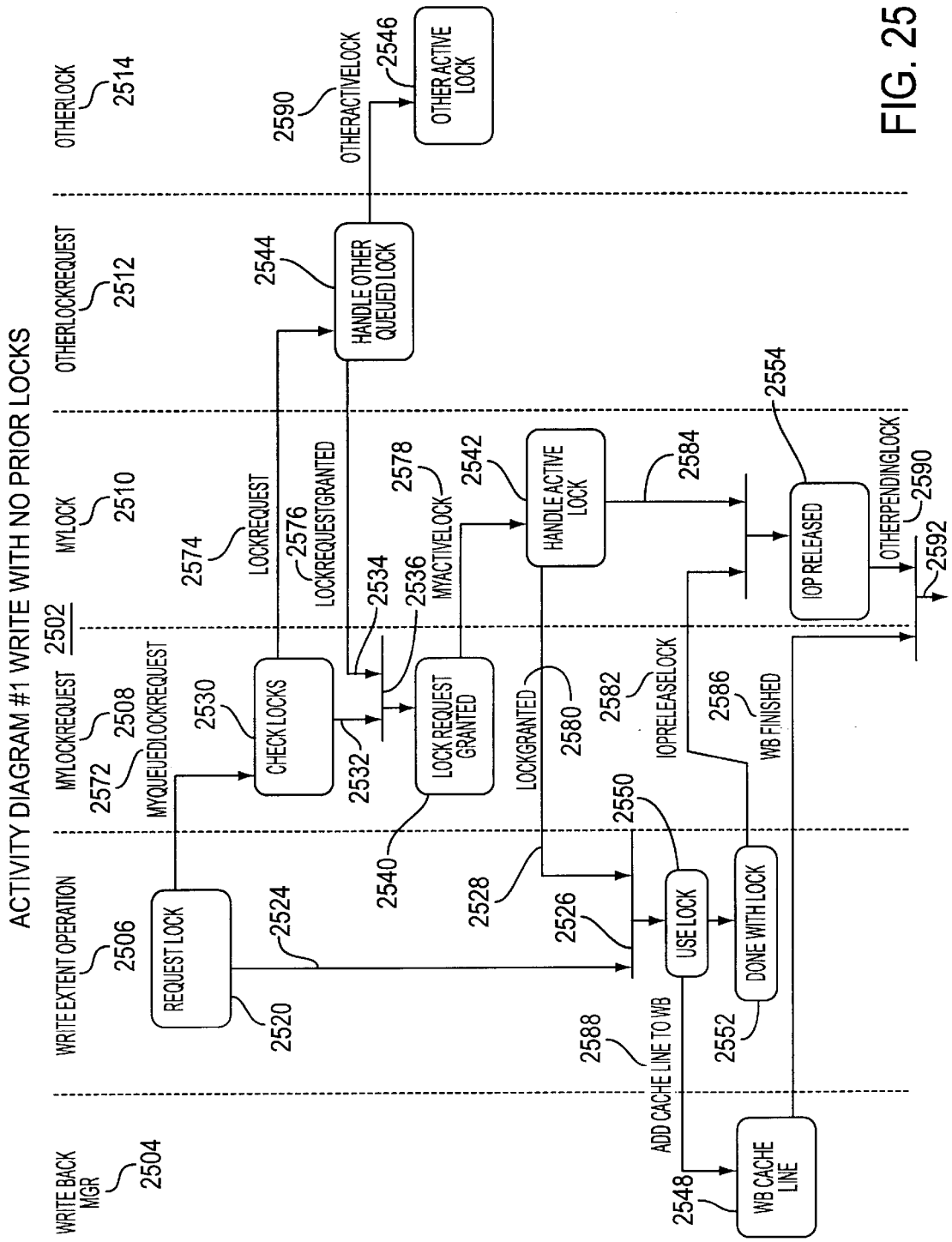
FIG. 25 is an illustration showing an exemplary activity diagram for a write command.
Figure 26:
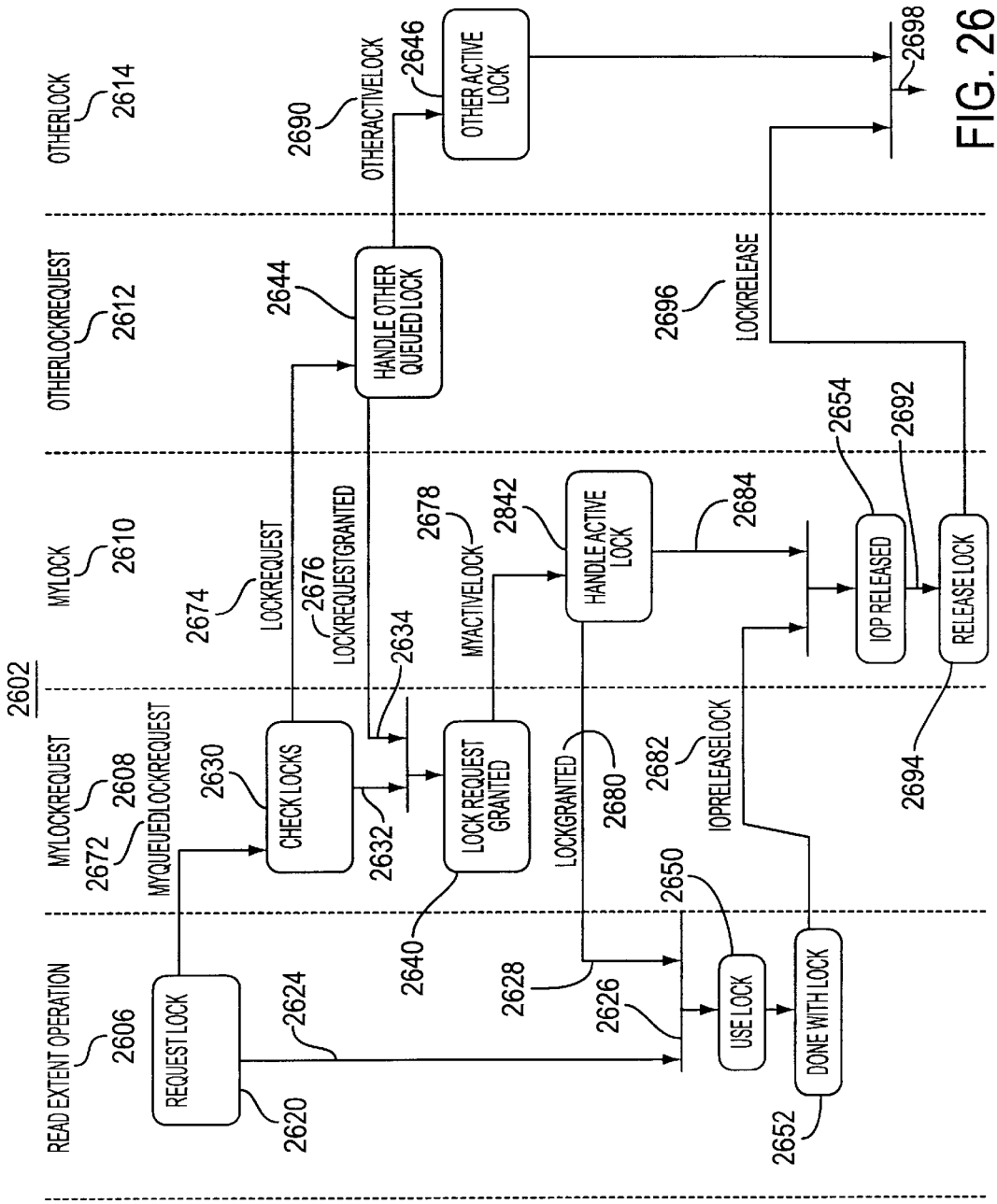
FIG. 26 is an illustration showing an exemplary activity diagram for a read command.

FIG. 15 is an illustration showing an exemplary state transition diagram for MyLockRequest object. This object performs communications for locks owned by a controller. FIG. 16 is an illustration showing an exemplary state transition diagram for MyLockRequest. These are locks owned by a controller. FIG. 17 is an illustration showing an exemplary state transition diagram for the WriteExtentOperation. This object handles write commands sent to a controller. FIG. 18 is an illustration showing an exemplary state transition diagram for the ReserveExtentOperation. This object processes the commands associated with SCSI device reservations. FIG. 19 is an illustration showing an exemplary state transition diagram for the RebuildExtentOperation. This object handles rebuilding redundant information when a storage component is replaced. FIG. 20 is an illustration showing an exemplary state transition diagram for the ReadExtentOperation. This object processes read commands sent to a controller. FIG. 21 is an illustration showing an exemplary state transition diagram for the OtherLockRequest. This object handles communications for locks which are requested by other controllers. FIG. 22 is an illustration showing an exemplary state transition diagram for the OtherLock. This object maintains information about locks owned by other controllers. FIG. 23 is an illustration showing an exemplary sequence diagram for a write command. FIG. 24 shows an exemplary sequence diagram for a read command. FIG. 25 is an illustration showing an exemplary activity diagram for a write a command. FIG. 26 shows an exemplary activity diagram for a read command. Those workers having ordinary skill in the art will in light of this description appreciate that the mechanism or procedure for maintaining cache consistency could be implemented in other ways and with different objects.

TABLE IV

Implicit Reservation Cache Coherency Class Descriptions

Ref. Table IV. Implicit Reservation Cache Coherency-Class Name and Description

1407 Class: Lock
    Description: An assignment of an extent to either HostID(s) or a ControllerID
    Data:
      systemDrive
      lockType [ReservationLock, MyLock, OtherLock]
    Subtypes: ReservationLock, QueuedLock
2318 Class: MyLock
    Description: A lock owned by this controller.
    Subtypes: PendingLock, ActiveLock TABLE IV-continued Implicit Reservation Cache Coherency Class Descriptions Ref. Table IV. Implicit Reservation Cache Coherency-Class Name and Description 2332 Class: OtherLock
  Description: A lock owned by another controller
  Subtypes: PendingLock, ActiveLock
1413 Class: PendingLock
  Description: A lock that has been requested but not yet granted
1411 Class: ReservationLock
  Description: Lock for external control of access to logical volumes. A reservation of
  an extent for a particular host or group of hosts. For normal SCSI RESERVE and
  RELEASE commands in the lock ownership will be limited to a single hostID
  determined by the hostBusID, controllerID, and portID. The only extent that will be
  valid is an entire system drive as extent reservations have been removed from the
  SCSI standards. For SCSI PERSISTENT RESERVATION IN and PERSISTENT
  RESERVATION OUT commands the ownership may be shared among multiple
  hostIDs that have the same reservationKey. Only one ReservationLock per system
  drive may be in force. A ReservationLock has no effect on existing QueueLocks. A
  ReservationLock will prevent a QueuedLock from being acquired on a system drive
  all IOPs except those generated internally or by the ReservationLock owner(s).
  Data:
    hostIDList - list of owning hostIDs
    reservationKey
    type - [normal, persistent]
  Subtypes: MyReservationLock, OtherReservationLock
1412 Class: ActiveLock
  Description: A lock that has been granted. The only reading and writing of data
  occurs when a controller owns an active lock whose extent includes the data to read or
  written.
  Subtypes: PendingLock, ActiveLock
1410 Class: QueuedLock
  Description: Lock for a coordination of data access to physical storage devices. A
  lock is owned by a particular controller and is used by one or more IOPs. The type of
  QueuedLock may be partialLock which locks an extent for write and read access, or it
  may be type blocking which allows read access for host read commands and rebuild
  operations. A partialLock is not released. It is held until requested by another
  controller. The release is implicit when the other controller's lock is granted. A
  blockingLock is released when all extentOperations have ceased using it. A
  QueuedLock is owned by a single controller. If there is contention for ownership of a
  lock for a particular extent, locks are queued in the order requests for access are made.
  If a request for access to an extent occurs simultaneously through both controllers, the
  lower controller ID number wins. A lock is an ActiveLock the owning controller has
  the ability to perform operations on this extent. If the owning controller cannot yet
  operate on the extent, then the QueuedLock is a PendingLock.
  Data:
    Type - [Blocking (allows read access, no cache invalidation),
      partial (allows write access and causes cache invalidation on non
      owning controller)]
    ControllerID - owning controller
    IOPList - list of IOPs using or waiting to use lock
    IOPcount - count of IOPs using lock
    CacheLineCount - count of cache lines in WB queue for this lock
    WBQueue0-function to put WB cache line into appropriate place in WBqueue
  Subtypes: MyLock, OtherLock
1409 Class: LockRequest
  Description: Process that coordinates permission to create a lock.
  Data:
    Type - lockType requested
    System drive
    PrimaryExtent
    SecondaryExtent
    IOP - IOP in this controller that requested the lock
  Subtypes: MyLockRequest, OtherLockRequest, MyReservationLockRequest,
  OtherReservationLock Request
2608 Class: MyReservationLockRequest
  Description: Attempts to modify or create a ReservationLock for a host attached to
  this controller.
  Data:
    Hosted
    ReservationType
    ReservationKey
2612 Class: OtherReservationLockRequest
  Description: Handles attempt by another controller to modify or create a
  ReservationLock.
  Data:
    Hosted
    ReservationType
    ReservationKey

TABLE IV-continued

Implicit Reservation Cache Coherency Class Descriptions

Ref. Table IV. Implicit Reservation Cache Coherency-Class Name and Description

1414 Class: MyLockRequest
    Description: Attempts to acquire a QueuedLock by issuing a LockRequest message to the other controller(s). Create a pending MyLock or an active MyLock when a response is returned. For lockType = blockingLock only a PrimaryExtent is requested. For lockType = blockingLock a PrimaryExtent and a SecondaryExtent are requested. If only a PrimaryExtent is requested, the lockRequest exits when the lock is granted. If a SecondaryExtent is requested, the lockRequest waits for either the SecondaryExtent to be granted or the PrimaryExtent lock to be released before terminating.
    Data:
        PrimaryExtent
        SecondaryExtent
        LockType [blockingLock, lockingLock]

1416 Class: PrimaryExtent
    Description: The user area that an Extent operation needs to operate on. The length is one or more stripe sizes. The startBlock is the start of a stripe boundary.

1417 Class: SecondaryExtent
    Description: An extent composed of one or more PrimaryExtents. SecondaryExtents are used whenever possible to minimize the number of outstanding locks required. when all SecondaryExtents are locked by a controller, that controller has a Full Lock and no longer has to check or acquire locks for individual commands.

1415 Class: OtherLockRequest
    Description: Handles lock request messages from another controller. Responds with one of the following: lockRequestGranted, lockRequestAcknowledged, lockRequestRejected. Informs writeBackManager data for Extents need to be prioritized on the write back queue. Creates OtherPendingLock or OtherActiveLock as appropriate.
    Data:
        PrimaryExtent
        SecondaryExtent
        LockType [blockingLock, lockingLock]
        ControllerID 1408 Class: Extent
    Description: An area of User data on a logical volume.
    Data:
        system drive
        startBlock
        numberOfBlocks
    Subtypes: PrimaryExtent, SecondaryExtent 1401 Class: ExtentOperation
    Description: An I/O process (IOP) that needs access to user data. The ExtentOperation coordinates to user data using Locks.
    Subtypes: RebuildExtentOperation, ReadExtentOperation, WriteExtentOperation, ReservationExtent Operation 1406 Class: WriteBackManager
    Description: For the purposes of this design the WriteBackManager reorders writeback cache lines when the cache lines are in an extent that has a lock requested. When cache lines associated with a lock are finished, the writeBack manager tells the OtherQueuedLock class that a cache line has been finished.

The foregoing description, for purposes of explanation, used specific nomenclature to provide a thorough understanding of the invention. However, it will be apparent to one skilled in the art that the specific details are not required in order to practice the invention. In other instances, well known structures are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

All publications and patent applications mentioned in this specification are herein incorporated by reference to the same extent as if each individual publication or patent application was specifically and individually indicated to be incorporated by reference.

What is claimed is:

1. A method of maintaining cache coherency amongst a plurality of caching storage controllers operating in unison in a dual-active configuration and supplying data in response to requests from one or more host computers; said method comprising the steps:

defining a storage volume reservation table data structure to maintain reserved, partial, and full ownership status of data extents that are part of the logical unit or storage volume, said ownership status applying to all or a portion of a logical unit or storage volume;

said storage volume reservation table having a plurality of reservation table entries indexed by storage volume number, each said reservation table entry including an ownership field, a hash table of locks, and a linked list of currently blocked data extents; and using said storage volume reservation table data structure to verify that a new update to the data is allowed.

2. The method in claim 1, wherein said ownership field specifying either that the controller in which the SVRT resides holds the reservation for this storage volume, or that another controller reserves the storage volume.

3. The method in claim 2, wherein said ownership field including an additional qualifier that identifies a data sector lock status as one of: (a) the storage volume contains a full lock of all data sectors, (b) the storage volume contains one or more number partial locks, or (c) certain data sectors are temporarily blocked.

4. The method in claim 1, wherein said hash table of locks field being indexed by hash entry value.

5. The method in claim 4, wherein said hash entry value being a value between and the total number of entries in the hash table of locks.

6. The method in claim 5, wherein as a lock is established it is assigned to a hash entry value calculated using a modulo operation on the start sector value of the lock.

7. The method in claim 1, wherein each said storage volume reservation table including a storage volume identifier, a plurality of storage volume state parameters including parameters indicating that the lock is full, partial, or a block and that the reservation is local or remote, and a hash table of locks.

8. The method in claim 7, wherein said storage volume state field within said storage volume reservation entry data structure providing a set of six flags to allow a quick check to be made to determine the state of reservations for a storage volume; said flags indicating that there are no locks, partial locks, block lock, local reservation, or remote reservation.

9. The method in claim 8, wherein said no lock status indicating that nobody currently owns any locks; said partial lock status indicating that the controller in which the storage volume reservation table is stored owns pieces of the storage volume, but not the entire storage volume; said block lock status indicating a temporary blocking lock is in place for this storage volume and usually indicating that another controller is performing an operation; said local reservation status indicating that this controller has a reserve command outstanding for this storage volume, and said remote reservation status indicating that another controller has a reserve command outstanding for this storage volume.

10. The method in claim 8, wherein each caching storage controller storing a my block locks list containing all of the outstanding blocking locks which have been granted to this controller.

11. The method in claim 1, wherein each caching storage controller storing a remote locks pending list containing all of the outstanding lock requests for this storage volume made by other controllers.

12. The method in claim 1, wherein each caching storage controller storing a local locks pending list containing all of the outstanding lock requests made by this controller to other controllers.

13. The method in claim 1, wherein each caching storage controller storing a data extent hash table containing all of the granted partial locks for this controller.

14. The method in claim 1, wherein each caching storage controller storing a block locks list containing all of the outstanding blocking locks which have been granted to other controllers; a block lock flag being set in the storage volume state field in there are any entries in the block locks list.

15. The method in claim 1, wherein each caching storage controller storing:

a remote locks pending list containing all of the outstanding lock requests for this storage volume made by other controllers;

a local locks pending list containing all of the outstanding lock requests made by this controller to other controllers;

a data extent hash table containing all of the granted partial locks for this controller;

a block locks list containing all of the outstanding blocking locks which have been granted to other controllers, a block lock flag being set in the storage volume state field in there are any entries in the block locks list; and a my block locks list containing all of the outstanding blocking locks which have been granted to this controller.

16. The method in claim 1, further comprising the step of defining a storage volume ownership transaction data structure established in a memory of each controller and tracking the state of a current transaction between the controller in which the data structure is established and an alternate controller.

17. The method in claim 16, wherein said storage volume ownership transaction data structure storing a transaction value, a current status, a time stamp value, a reference to a host command, and a reference to the program code that handles transaction completion.

18. The method in claim 17, wherein said transaction value comprising a unique identifier used to initiate a storage volume ownership request and to track a corresponding storage volume ownership response.

19. The method in claim 17, wherein said current status value comprising a state variable that maintains the current state of the transaction, said current state being selected from among a lock requested state, a lock pending state, a lock granted state, and a lock clearing state.

20. The method in claim 17, wherein said time stamp value comprising a value to mark the time when a transaction started and being used to track how long a lock request has been active but not yet granted.

21. The method in claim 16, wherein said storage volume reservation table is updated when the storage volume ownership transaction establishes a lock.

22. The method in claim 1, wherein said method further comprises the step of sending a storage volume ownership request from one controller to another controller requesting a change in the current storage volume reservation table; said storage volume ownership request using a lock request data structure to contain information to send to another controller to establish a lock.

23. The method in claim 22, wherein said lock request data structure is a data structure that is sent as a message to another controller in order to establish a lock on a storage volume and includes a parameter identifying the starting sector for this lock region, a parameter identifying the number of sectors to force to disk and invalidate, a parameter that provides a unique identifier to allow other controllers which received the lock requests to determine who made the request, a parameter used to uniquely identify which lock is being serviced, a parameter that identifies the storage volume for which the lock is being requested, and a parameter which identifies the type of lock being requested; said type of lock being requesting being a reservation, full, partial, or block.

24. The method in claim 23, wherein said primary lock request parameter identifies the region of the storage volume which must be flushed before the host requests can be serviced by the requesting controller, and said secondary lock request parameter identifies the region of the storage volume which needs to be flushed before the lock can be coalesced with another lock or before the entire data extent of the storage volume can be locked.

25. The method of claim 22, further comprising the step of generating a storage volume ownership response message in response to said storage volume ownership request message.

26. The method of claim 25, wherein said storage volume ownership response message includes data fields which pass back of the status of the request and the transaction value.

27. In a computing environment that allows data access through two or more dual-active caching storage-device controllers, a storage device access reservation system comprising:
- a storage volume reservation table data structure defined in separate memories within each of said two or more dual-active caching storage-device controllers that stores information indicating which of said controllers has access rights to particular storage volume or logical unit regions;
- said storage volume reservation table having a plurality of reservation table entries indexed by storage volume number, each said reservation table entry including an ownership field, a hash table of locks, and a linked list of currently blocked data extents, said reservation table entry applying to all or a portion of a logical unit or storage volume; and
- said storage volume reservation table data structure providing consistent information in each of said controllers.

28. A computer program product for maintaining cache coherency amongst a plurality of dual-active caching storage controllers operating in unison supplying data in response to requests from one or more host computers, the computer program product including a computer readable medium and a computer mechanism stored thereon, the computer mechanism performing a method comprising:
- defining a storage volume reservation table data structure to maintain reserved, partial, and full ownership status of data extents that are part of the logical unit or storage volume, said ownership status applying to all or a portion of a logical unit or storage volume; and
- using said storage volume reservation table data structure to verify that a new update to the data is allowed.

29. The computer program product as in claim 28, wherein said storage volume reservation table data structure having a plurality of reservation table entries indexed by storage volume number, each said reservation table entry including an ownership field, a hash table of locks, and a linked list of currently blocked data extents.

30. A method for accessing data on a storage volume which is accessible by a plurality of multiple-active controllers by a host computer, said method comprising:
- receiving a host system read request command or a host system write request command;
- implicitly generating a reservation for each said read/write command to ensure that the data accessed by the host is synchronized with data recorded on the storage volume, said implicit reservations being represented by locks in a storage volume reservation table, said reservation applying to all or a portion of said storage volume; and
- said storage volume reservation table including a storage volume identifier, a plurality of storage volume state parameters including parameters indicating that the lock is full, partial, or a block and that the reservation is local or remote, and a hash table of locks.

31. The method in claim 30, wherein said storage volume state field within said storage volume reservation entry data structure providing a set of six flags to allow a quick check to be made to determine the state of reservations for a storage volume; said flags indicating that there are no locks, partial locks, block lock, local reservation, or remote reservation.

32. The method in claim 31, wherein said no lock status indicating that nobody currently owns any locks; said partial lock status indicating that the controller in which the storage volume reservation table is stored owns pieces of the storage volume, but not the entire storage volume; said block lock status indicating a temporary blocking lock is in place for this storage volume and usually indicating that another controller is performing an operation; said local reservation status indicating that this controller has a SCSI Reserve command outstanding for this storage volume, and said remote reservation status indicating that another controller has a SCSI Reserve command outstanding for this storage volume.

33. The method in claim 30, wherein a controller processes a host system read request for the controller to read user data from a specified extent on the storage volume by the steps of:
- receiving said host read request command;
- directing said host read command to a logical unit number (LUN) and storage volume of the controller;
- checking the storage volume reservation table volume state field for the storage volume identified by the LUN associated with the host read request command;
- if the controller has a fill ownership the controller proceeds to accept the command and process the host request, if the controller does not have full ownership the controller checks to see if another controller has a device reservation, and if another controller has a device reservation the controller rejects the host request;
- said controller checking to determine if said controller owns a partial lock which covers the extent associated with the host read request command by: (i) examining a partial lock bit of a volume state field to determine if the controller owns any partial locks, and (ii) if the controller owns a partial lock then examining the locks in a hash table of locks to determine if a lock that it owns encloses the extent associated with the host read request command; and
- if the controller owns an enclosing lock the controller accepts the command, and if the controller does not own an enclosing lock the controller requests a lock from the other controller and upon receiving an acknowledgment that the lock has been granted the controller accepts the command or upon not receiving an acknowledgment the controller terminates the host read request command.

34. The method in claim 33, wherein said step of accepting said command including steps of: (i) if said read or write command is accepted the controller determining if the command covers a region which is blocked, and if the determination indicates that the command does not cover a region which is blocked, the command is processed and may move data into a cache; and (ii) if the determination indicates that the command does cover a region which is blocked, then the controller queues the command to be rescheduled when the block of region has been released, said command being processed by said controller after the lock has been released.

35. The method in claim 30, wherein a controller processes a host system write request for the controller to write user data to a specified extent on the storage volume by the steps of:

a controller processes a host system write request for the controller to write user data to a specified extent on the storage volume by:

receiving said host write request command;

directing said host write command to a logical unit number (LUN) and storage volume of the controller;

checking the storage volume reservation table volume state field for the storage volume identified by the LUN associated with the host write request command;

if the controller has a full ownership the controller proceeds to accept the command and process the host request, if the controller does not have full ownership the controller checks to see if another controller has a device reservation, and if another controller has a device reservation the controller rejects the host request;

said controller checking to determine if said controller owns a partial lock which covers the extent associated with the host write request command by: (i) examining a partial lock bit of a volume state field to determine if the controller owns any partial locks, and (ii) if the controller owns a partial lock then examining the locks in a hash table of locks to determine if a lock that it owns encloses the extent associated with the host write request command; and if the controller owns an enclosing lock the controller accepts the command, and if the controller does not own an enclosing lock the controller requests a lock from the other controller and upon receiving an acknowledgment that the lock has been granted the controller accepts the command or upon not receiving an acknowledgment the controller terminates the host write request command.

36. The method in claim 35, wherein said step of accepting said command including steps of: (i) if said read or write command is accepted the controller determining if the command covers a region which is blocked, and if the determination indicates that the command does not cover a region which is blocked, the command is processed and may move data into a cache; and (ii) if the determination indicates that the command does cover a region which is blocked, then the controller queues the command to be rescheduled when the block of region has been released, said command being processed by said controller after the lock has been released.

37. In a computing environment that allows data access to a storage volume through two or more active caching controllers, a storage access reservation system comprising:

a storage volume reservation table data structure defined in a separate memory within each of said two or more caching controllers;

said storage volume reservation table having a plurality of reservation table entries indexed by storage volume number, each said reservation table entry including an ownership field, a hash table of locks, and a linked list of currently blocked data extents, said reservation entry field identifying reservation status applying to all or a portion of said storage volume; and said reservation table data structure providing consistent information in each of said controllers.

38. The storage reservation system in claim 37, wherein said reservation table data structure includes a Logical Unit Number (LUN) reservation table.

39. The storage reservation system in claim 37, wherein said reservation table data structure explicitly reserving storage volumes using any current storage volume (or LUN) reserve commands.

40. The storage reservation system in claim 37, wherein said reservation table data structure implicitly reserving storage volumes using a write operation.

41. The storage reservation system in claim 37, wherein said system providing the capability of invalidating a controller's cache based on acquiring new reservation.

* * * * *

UNITED STATES PATENT AND TRADEMARK OFFICE
CERTIFICATE OF CORRECTION

PATENT NO. : 6,247,099 B1
DATED : June 12, 2001
INVENTOR(S) : Skazinski et al.

It is certified that error appears in the above-identified patent and that said Letters Patent is hereby corrected as shown below:

Column 25,
Line 16, insert -- 0 -- after "between", such that line 16 reads as follows: *"being a value between 0 and the total number of entries in the"*

Signed and Sealed this

First Day of January, 2002

Attest:

Attesting Officer

JAMES E. ROGAN
Director of the United States Patent and Trademark Office